(12) United States Patent
Kenderov

(10) Patent No.: US 10,290,000 B2
(45) Date of Patent: May 14, 2019

(54) METHODS SYSTEMS AND COMPUTER PROGRAM PRODUCTS FOR VERIFYING CONSUMER IDENTITY DURING TRANSACTION

(71) Applicant: INTUIT INC., Mountain View, CA (US)

(72) Inventor: Stoyan Kenderov, San Francisco, CA (US)

(73) Assignee: INTUIT INC, Mountain View, CA (US)

( * ) Notice: Subject to any disclaimer, the term of this patent is extended or adjusted under 35 U.S.C. 154(b) by 133 days.

(21) Appl. No.: 15/636,560

(22) Filed: Jun. 28, 2017

(65) Prior Publication Data

US 2017/0300915 A1    Oct. 19, 2017

Related U.S. Application Data

(63) Continuation of application No. 14/054,558, filed on Oct. 15, 2013, now Pat. No. 9,727,866.

(51) Int. Cl.
| | |
|---|---|
| *G06Q 20/20* | (2012.01) |
| *G06Q 20/40* | (2012.01) |
| *G06Q 50/00* | (2012.01) |
| *G06Q 20/32* | (2012.01) |
| *G06F 17/30* | (2006.01) |

(52) U.S. Cl.
CPC ....... *G06Q 20/4014* (2013.01); *G06Q 20/202* (2013.01); *G06Q 20/3224* (2013.01); *G06Q 20/409* (2013.01); *G06Q 50/01* (2013.01); *G06F 17/30339* (2013.01); *G06Q 20/206* (2013.01)

(58) Field of Classification Search
CPC .......................... G06Q 20/206; G06Q 20/202
See application file for complete search history.

(56) References Cited

U.S. PATENT DOCUMENTS

| | | |
|---|---|---|
| 5,334,821 A | 8/1994 | Campo et al. |
| 6,385,594 B1 | 5/2002 | Lebda et al. |
| 7,149,296 B2 | 12/2006 | Brown et al. |
| 7,653,590 B1 | 1/2010 | Kroon et al. |
| 8,249,983 B2 | 8/2012 | Dilip et al. |
| 8,294,549 B2 | 10/2012 | Samovar et al. |
| 8,380,177 B2 | 2/2013 | Laracey |
| 2003/0055783 A1 | 3/2003 | Cataline et al. |
| 2003/0074298 A1 | 4/2003 | Daum |

(Continued)

OTHER PUBLICATIONS https://www.facebook.com/PhoneSearch/app_1903.

(Continued)

*Primary Examiner* — A. Hunter Wilder
(74) *Attorney, Agent, or Firm* — DLA Piper LLP US

(57) ABSTRACT

Computerized methods, systems and computer program products for determining how an identity of a consumer can be verified during a transaction involving the consumer and a merchant. Embodiments access and analyze data of an account the consumer has with an online social network to derive a challenge question response options. The social-network based challenge question and response options are presented to the consumer, and the consumer's selection of certain response options is used to confirm that the consumer is the person named on a credit card or other payment instrument or that other identification or verification information should be requested by the merchant before completing the transaction.

64 Claims, 22 Drawing Sheets

(56) References Cited

U.S. PATENT DOCUMENTS

| | | | |
|---|---|---|---|
| 2003/0182194 A1 | 9/2003 | Choey et al. |
| 2004/0230527 A1 | 11/2004 | Hansen et al. |
| 2007/0255652 A1 | 11/2007 | Tumminaro et al. |
| 2008/0005037 A1 | 1/2008 | Hammad et al. |
| 2008/0010215 A1 | 1/2008 | Rackley, III et al. |
| 2008/0222038 A1 | 9/2008 | Eden et al. |
| 2009/0037983 A1 | 2/2009 | Chiruvolu et al. |
| 2009/0119170 A1 | 5/2009 | Hammad et al. |
| 2009/0204510 A1 | 8/2009 | Hwang |
| 2009/0327135 A1 | 12/2009 | Nguyen et al. |
| 2010/0180127 A1 | 7/2010 | Li et al. |
| 2010/0229223 A1 | 9/2010 | Shepard et al. |
| 2010/0235279 A1 | 9/2010 | Bouchard et al. |
| 2011/0010289 A1 | 1/2011 | Kranzley |
| 2012/0022973 A1 | 1/2012 | Makhotin |
| 2012/0072975 A1 | 3/2012 | Labrador et al. |
| 2012/0216260 A1 | 8/2012 | Crawford et al. |

OTHER PUBLICATIONS https://www.facebook.com/SearchByEmailNow.
http://en.wikipedia.org/wiki/Digital_wallet.
http://www.cnbc.com/id/46907307.
http://en.wikipedia.org/wiki/Credit_card_fraud.
http://en.wikipedia.org/wiki/List_of_social_networking_websites.
http://www.creditcards.com/credit-card-news/how-a-credit-card-is-processed-1275.php.
http://www.forbes.com/sites/adamtanner/2013/07/12/yes-gas-pumps-really-do-need-your-zip-code-even-if-stores-usually-do-not/.
http://www.usatoday.com/story/tech/personal/2012/11/05/debit-card--numbers-pins-stolen-at-pos-terminals/1675795/.
https://www.facebook.com/about/graphsearch.
http://www.insidefacebook.com/2013/10/09/report-facebook-to-add-graph-search-to-ios-app-update-messenger/.
http://www.pcworld.com/article/2050820/facebook-widens-graph-search-to-include-posts-status-updates.html.
http://careerenlightenment.com/use-facebooks-graph-search-supercharge-professional-network.
Final Office Action dated May 8, 2013 in U.S. Appl. No. 13/094,817, filed Apr. 26, 2011, (30 pages).
Amendment as filed Jan. 31, 2013 in U.S. Appl. No. 13/094,817, filed Apr. 26, 2011, (18 pages).
Office Action dated Jul. 31, 2013 in U.S. Appl. No. 13/094,817, filed Apr. 26, 2011, (34 pages).
Anonymous, "Maximize your mobile web experience with new mini phone from LG," ACN Newswire, Asia Corporate News, Tokyo, Apr. 7, 2010.
Myles, Ginger, et al., "Preserving privacy in environments with location-based applications," IEEE, Jan.-Mar. 2003, pp. 56-64.
PCT International Search Report dated Jun. 26, 2014 in International Application No. PCT/US2013/071081 filed Nov. 20, 2013, Form ISA 220 and 210, (7 pages).
PCT Written Opinion of the International Searching Authority dated Jun. 26, 2014 in International Application No. PCT/US2013/071081 filed Nov. 20, 2013, Form ISA 237, (11 pages).
PCT International Preliminary Report on Patentability (Chapter I of the Patent Cooperation Treaty) for PCT/US2013/071081, Applicant: Intuit Inc., Form PCT/IB/326 and 373, dated Apr. 28, 2016 (13 pages).

| Card - First Name (902a) | Card - Last Name (902b) | Phone (902c) | Email (902d) | Other (902e) | Social Network (902f) |
|---|---|---|---|---|---|
| John | Smith | 123-45-6789 | js@mail.com | | www.facebook.com |
| Tom | Smyth | 987-65-4321 | ts@mail.com | Other login code | www.linkedin.com |
| Victor | Smythe | 234-56-7890 | vs@mail.com | | www.pinterest.com |
| Jane | Jones | 876-54-3210 | jj@mail.com | Other login code | www.twitter.com |

FIG. 9

METHODS SYSTEMS AND COMPUTER PROGRAM PRODUCTS FOR VERIFYING CONSUMER IDENTITY DURING TRANSACTION

CROSS-REFERENCE TO RELATED APPLICATION

This application is a continuation of co-pending U.S. application Ser. No. 14/054,558, filed Oct. 15, 2013, entitled METHODS SYSTEMS AND COMPUTER PROGRAM PRODUCTS FOR VERIFYING CONSUMER IDENTITY DURING TRANSACTION, priority of which is claimed under 35 U.S.C. § 120, and the contents of which are incorporated herein as though set forth in full.

SUMMARY

Embodiments relate to verifying consumer information during a transaction utilizing dynamic, challenge-response protocols based at least in part upon a consumer's online activities reflected in accounts the consumer has with one or more of a social networking site, an e-commerce site and an electronic mail site or program.

The consumer's online activity data is analyzed during a transaction to determine a challenge question and response options for use in verifying that the consumer is the person named on a tendered payment instrument. Embodiments may supplement or replace other known consumer identification or verification data such as signatures and PIN numbers provided by consumers at a point of sale (POS) device of a merchant.

Certain embodiments relate to verifying consumer information during a transaction utilizing dynamic, social-network based challenge-response protocols by utilizing a consumer's online social network data to determine or verify the consumer's identity during a transaction.

Certain embodiments are directed to computer-implemented methods, systems and computer program products for verifying a consumer's identity during a transaction without requiring the consumer to key in personal information such as a zip code or a PIN number of a debit card. Instead, the consumer can select from response options including a content item of an online social network site used by the consumer.

Certain other embodiments are directed to determining a challenge question and response options for consumer identity verification after a transaction has been initiated, but before the transaction has been completed, e.g., before the consumer has left merchant store or location and taken delivery of a good or before a merchant has performed service or agreed to perform a service.

Embodiments are also directed to computer-implemented methods, systems and computer program products for determining and/or presenting dynamic challenge questions requiring a pre-determined response, or selection of a valid response from a plurality of responses including invalid responses, in order to verify a consumer's identity so that the transaction can then be completed. A consumer may have to respond to one or multiple challenge questions before a merchant can be satisfied the consumer is the person named on a payment instrument. Thus, embodiments are in contrast to, for example, a consumer opening a credit card account and having to enter a pre-determined zip code or phone number of the consumer, or a pre-determined PIN that was selected by the consumer when opening or configuring a debit card account since the consumer does not know the challenge question or how to answer the challenge question before the transaction is initiated by tendering payment.

Embodiments are also directed to accessing an account the consumer has with an online social network site and storing data to be utilized to determine challenge questions and response options including at least a valid response. This is done before the consumer tenders a form of payment to a merchant to make a purchase. A consumer's account may be accessed before a transaction has been initiated or in response to a request by a merchant after a transaction has been initiated by, for example, swiping a credit card through the POS device, but before the transaction has been completed.

Certain embodiments are directed to determining challenge questions and respective response options based on data of an account a consumer has with one or more social networking site such as FACEBOOK, MYSPACE, FOURSQUARE, PINTEREST, GOOGLE+ and LINKEDIN social networking sites (facebook.com, myspace.com, foursquare.com, pinterest.com, plus.google.com, linkedin.com).

Certain embodiments are directed to a dynamic, social-network based challenge-response methods, systems and computer program products. For example, a party involved in processing the payment or determining or communicating authorization to utilize a tendered form of payment accesses or retrieves data from an account the consumer has with an online social network. This social networking site account data is analyzed to determine a valid response comprising content of the consumer's social network account and to derive a corresponding challenge question to which the correct answer is the valid response. Embodiments may also involve determining invalid response options such that the consumer is presented with the challenge question and a plurality of response options including the valid response that is a content item of the consumer's account with the social networking site and one or more invalid responses that may or may not be from the social networking site.

Thus, with embodiments, a consumer may still enter information such as a zip code or PIN as is traditionally done, but embodiments provide for independent identity verification by leveraging data of a consumer's online social network account and doing so in a way that prevents or reduces fraud by utilizing data more likely to be known by the consumer and less likely to be known or not known by a fraudulent user or thief. Given the real-time identification verification capabilities provided by embodiments, transactions can be completed without the need for manual entry of a zip code or PIN into a merchant POS terminal, and may also eliminate the need for the consumer to enter a signature into a keypad or touchscreen.

Certain embodiments are directed to computer-implemented methods, systems and computer program products for verifying a consumer's identification without the consumer or user having to key in any personal identification information or PIN numbers. Instead, embodiments leverage data of consumer accounts with online social networking sites to determine which challenge questions to ask and which response options to the challenge questions should be presented. In this manner, the consumer will select a response option to one or more social-network based challenge questions instead.

Embodiments may involve challenge questions and response options that change after each use of a payment card or other a form of payment, after a pre-determined number of transactions (e.g., after each transaction or after a pre-determined number of transactions), or after a pre-determined time (e.g., after a week or month). Embodiments provide a more secure protocol compared to traditional systems that rely upon static address information or PIN numbers previously selected by a consumer and that is more likely to be stolen. Moreover, challenge questions and valid response options determined according to embodiments may be based on social network data having specified timeliness attributes, e.g., challenge questions and responses are based on new or updated social network data or social network data that was posted to the account within a pre-determined time, and this recent data is more likely to be known by the consumer and less likely to be known to a thief.

Embodiments may involve one or multiple online social networking sites with which the consumer has online accounts, and a particular challenge question and/or response option may be determined based on one online social networking site, multiple online social networking sites, accounts of the consumer or user, accounts of online social connections of the consumer, or accounts of online social connections of online social connections of the consumer or user.

Certain embodiments are directed to challenge questions and response options being presented to a consumer through a merchant payment device such as an in-store POS terminal or through a mobile communication device of a merchant executing a mobile payment application such as GOPAYMENT mobile payment application. In these embodiments, for example, after a credit or other payment card is swiped or data thereof entered into the POS device, the POS device receives and displays one or more challenge questions with response options to the user. The user selects a response option through the POS device display or other data input method. The POS terminal, which may have the valid response, compares the response entered or selected by the consumer and the correct or valid response to determine whether the consumer is the person named on a payment instrument, e.g., a name on a credit or debit card or a check.

Certain embodiments are directed to determining dynamic challenge questions and response options and communicating with a consumer's mobile communication device to present a challenge question and response options to the consumer via the consumer's mobile communication device and providing a result regarding whether or not the consumer's identity was confirmed to the merchant. Thus, in these embodiments, the interaction concerning challenge questions and responses occurs between the intermediate payment processor and the consumer, rather than between the merchant and the consumer.

Certain embodiments are directed to how challenge questions and response options are determined and presented to the consumer directly via the consumer's mobile communication device or presented to the consumer via the merchant's POS terminal. Other embodiments are directed to determining invalid responses that are included within a plurality of response options including a valid response option and at least one invalid response option.

Embodiments are also directed to computer-implemented methods, systems and computer program products for verifying a consumer's identity independently of authorization determinations made by an issuer of a payment card.

Embodiments are also directed to reducing fraud and financial losses resulting from theft of payment instruments such as credit cards, debit cards and negotiable instruments such as checks.

Embodiments may involve a consumer tendering a form of payment (e.g., a physical credit card) and manually selecting a response option to a challenge question displayed by the merchant's POS device to the consumer. Rather than a physical card or other form of payment, embodiments may involve a consumer tendering payment from a mobile wallet via the mobile communication device, and the consumer manually selects a response option to a challenge question displayed by the merchant's POS device to the consumer. Further, rather than selecting a response option displayed on the merchant's POS device, the challenge question and response options may be communicated to the consumer's mobile communication device so that the consumer can select a response option via the interface, display or touchscreen of the mobile communication device rather than using the merchant POS device. In one embodiment, this involves communications between the intermediate computer the mobile communication device for presenting and answering the challenge question. In another embodiment, this may involve a wireless connection being established between the POS device and the consumer's mobile communication device (e.g., a near field communication (NFC) or other suitable wireless connection. Such connections may be the same or different from a connection used for payment tendered by a mobile wallet, if a physical credit card is not tendered and a credit card or credit card data of a mobile wallet is used instead.

Embodiments are also directed to verifying an identity of a consumer that has tendered a physical form of payment (e.g., a credit card, payment card or check), and involves a consumer's mobile communication device. Embodiments may involve the consumer's mobile communication device communicating with the merchant POS device and/or the intermediate computer.

Embodiments are also directed to verifying an identity of a consumer that has tendered a mobile form of payment (e.g., a card from a mobile wallet of the consumer's mobile communication device) and using the mobile communication device for verification of the consumer's identity. Embodiments may involve the consumer's mobile communication device communicating with the merchant POS device and/or the intermediate computer.

Embodiments are also directed to eliminating the need for traditional consumer inputs such as a signature, zip code or PIN number manually entered at the point of sale when using credit cards, debit cards or other forms of payment, and may be utilized independently of or in conjunction with such methods. Embodiments are also directed to a type of identification verification that is separate from consumer biometrics, and that may be utilized independently of or together with such methods.

Embodiments are related to computer-implemented methods for providing data to determine or verify consumer's identity or determining or verifying a consumer's identity before a transaction has been completed, e.g., while the consumer is at the merchant POS device waiting for a separate issuer authorization to utilize a credit card.

One embodiment is directed to a computer-implemented method for providing a merchant with data for verifying an identity of a consumer that has tendered a payment card to purchase a good or service from a merchant during a transaction and that is performed by an intermediate computer in communication with and between a POS terminal of the merchant and a computer hosting an online social network site. The method comprises the intermediate computer receiving a request by the POS terminal for data used to verify the consumer's identity. For example, this request may be transmitted by the merchant POS terminal after or in response to swiping of a credit card tendered by the consumer. The method further comprises determining a challenge question and one or more options for responding to the challenge question. At least one response option comprises a valid response and at least one response option is invalid. At least the challenge question and the valid response are determined by the intermediate computer based at least in part upon data of an account the consumer has with the online social network site. The method further comprises the intermediate computer transmitting the challenge question and the response options to the POS terminal before the transaction has been completed (e.g., while the consumer is waiting at the POS terminal) for presentation to the consumer through the POS terminal. The consumer can answer the challenge question and the merchant to verify the consumer's identity based at least in part upon whether the consumer selects the valid response.

A further embodiment is directed to a computer-implemented method for providing a merchant with data for verifying an identity of a consumer that has tendered a payment card to purchase a good or service from a merchant during a transaction, the method being performed by an intermediate computer in communication with a POS terminal of the merchant and a computer hosting an online social network site. The method comprises the intermediate computer receiving a request by the POS terminal data for verification of the consumer's identity and the intermediate computer determining a challenge question and a valid response to the question based at least in part upon data of an account the consumer has with an online social network site and transmitting the challenge question and the valid response to the POS terminal before the transaction has been completed. The challenge question and valid response are presented to the consumer through the POS terminal to allow the consumer to answer the challenge question and allow the merchant to verify the consumer's identity based at least in part upon whether the consumer selects the valid response.

Yet another embodiment is directed to a computer-implemented method for providing a merchant with data for verifying an identity of a consumer that has tendered a payment card to purchase a good or service from a merchant during a transaction, the method being performed by an intermediate computer in communication with a POS terminal of the merchant, a computer hosting an online social network site and a mobile communication device of the consumer. The method comprises receiving a request by the POS terminal data to verify an identity of the consumer and determining a challenge question and options for responding to the challenge question based at least in part upon data of an account the consumer has with the online social network site, at least one response option being a valid response to the challenge question and at least one response option being an invalid response to the challenge question. The method further comprises transmitting the challenge question and the response options to the mobile communication device for presentation to the consumer to allow the consumer to respond to the challenge question through the mobile communication device and receiving the response option selected by the consumer in response to the challenge question. The method further comprises determining whether the consumer has selected the valid response option and when the consumer has selected the valid response option, transmitting a message to the POS terminal in response to the request indicating that the consumer's identity has been verified, else transmitting a message to the POS terminal indicating that the consumer's identity has not been verified.

A further embodiment is directed to a computer-implemented method for providing a merchant with data for verifying an identity of a consumer that has tendered a payment card to purchase a good or service from a merchant during a transaction, the method being performed by an intermediate computer in communication with a POS terminal of the merchant, a computer hosting an online social network site and a mobile communication device of the consumer. The method comprises receiving a request by the POS terminal data for a challenge question and options for responding to the challenge question, at least one response option being a valid response to the challenge question and at least one response option being an invalid response to the challenge question. The method further comprises determining the challenge question and response options based at least in part upon data of an account the consumer has with the online social network site. The method further comprises transmitting the challenge question and the response options to the mobile communication device for presentation to the consumer to allow the consumer to respond to the challenge question through the mobile communication device before the transaction has been completed and transmitting at least the valid response to the POS terminal before the transaction has been completed.

While certain embodiments are described as being directed to steps performed by the intermediate computer, other embodiments are directed to computer-implemented methods performed by a merchant POS device such as an in-store terminal or mobile communication device executing a mobile payment application. For example, such embodiments may involve one or more or all of transmitting a request for identification criteria to the intermediate computer, receiving one or more challenge question and respective response option in response to the request, presenting the one or more challenge questions and respective response options to the consumer via the POS device, receiving consumer input in response to the challenge question, and determining whether the valid response or an invalid response was selected, which is used to determine whether or not the consumer is who he or she claims. Further, in other embodiments involving a method performed by a merchant POS device, the merchant POS device does not receive the actual challenge question and response options and instead receives data of a determination made by the intermediate computer (e.g., when a user responds to the intermediate computer rather than to the merchant's POS device).

Other embodiments are directed to steps performed by a mobile communication device such as a smartphone or tablet computing device of the consumer executing an application. For example, such embodiments may involve one or more or all of receiving one or more challenge questions and respective response options, e.g., in an electronic mail or SMS message, from an intermediate computer, receiving the consumer's selection of a response option in response to the challenge question, and transmitting the response to the intermediate computer. As another example, such embodiments may involve one or more or all of receiving one or more challenge questions and respective response options, e.g., via a NFC or other suitable wireless connection, from a merchants POS device, receiving the consumer's selection of a response option in response to the challenge question, and transmitting the response to the merchant's POS device.

Yet other embodiments are directed to steps performed by a computer hosting the online social networking site with which the consumer has an account. Such embodiments may involve one or more or all of receiving a request by the intermediate or processor computer for access to a consumer's account (e.g., before a transaction or during a transaction in response to a merchant request), identifying an account of a consumer that is the subject of a request (e.g., by consumer data such as the consumer's phone number or e-mail address provided by the consumer when setting up the online social networking account or configuring the online social network account for use according to embodiments), and providing access to the account to allow the intermediate computer to access or download data of the consumer's account, or transmit data of the consumer's account to the intermediate computer.

Embodiments may also involve method steps performed by multiple components that cooperatively operate to execute embodiments. For example, depending on whether or not a consumer's mobile communication device is utilized, embodiments may involve method steps performed by the intermediate computer and the consumer's mobile communication device; the intermediate computer and the computer hosting the online social networking site; the intermediate computer and the merchant's POS device; the merchant's POS device and the consumer's mobile communication device; the merchant's POS device and the computer hosting the online social networking service; the consumer's mobile communication device (or other computing device) and the computer hosting the online social networking site; the intermediate computer, the merchant's POS device and the consumer's mobile communication device; the intermediate computer, the merchant's POS device and the computer hosting the online social networking site; the merchant's POS device, the consumer's mobile communication device and the computer hosting the online social networking site; and all of the intermediate computer, the merchant's POS device, the computer hosting the online social networking site and the computer hosting the online social networking site.

In a single or multiple embodiments, the merchant's POS device is in the form of an in-store POS terminal or a merchant's mobile communication device executing a mobile payment application operable or configured to accept mobile payments from consumers (e.g., by transmitting a request to the intermediate computer via a cellular network).

In a single or multiple embodiments, the online social network site comprising a website that allows registered users to generate profiles from within the website and that reflects relationships or electronic social connections with other users of the website. In a single or multiple embodiments, the intermediate computer communicates with the computer hosting the online social networking site to receive or access data of the consumer account and determine the challenge question and response options in response to the request by the point of sale terminal and before the transaction has been completed.

In a single or multiple embodiments, the intermediate computer accesses the consumer's account by determining or receiving consumer authentication data and presenting the consumer authentication data to an interface to the online social networking site to access the consumer's account with the online social networking site through the interface utilizing the consumer data. For example, for this purpose, a request by the POS device to the intermediate computer may include a name on the payment card tendered by the consumer, and the intermediate computer looks up the name within a database and determines the consumer data associated with the name. The consumer data may be at least one of an electronic mail address and a phone number of the consumer associated with the name that is associated with, included within or linked to the consumer's account. The name data received from the merchant's POS device may also be utilized with the consumer data if so configured.

In a single or multiple embodiments, the challenge question and the valid response are not known by the intermediate computer, and were not previously selected by the consumer, before the intermediate computer receives the request by the POS device.

In a single or multiple embodiments, the consumer grants permission to the intermediate computer, or to the host computer, for the intermediate computer to access the consumer's online social networking site account, but the intermediate computer has not provided the challenge question or the valid response to the consumer before the transaction has been initiated or before the request by the POS device.

In a single or multiple embodiments, at least the challenge question and the valid response are dynamic such that different challenge questions and respective valid responses based at least in part upon respective data of the consumer's account are determined by the intermediate computer for use during respective different transactions. For example, in one embodiment, the consumer tendered the payment card to purchase another good or service from a second merchant during a second, subsequent transaction such that the intermediate computer receives a request by a second POS device if the second merchant for verification of the consumer's identity and determines a second challenge question and options for responding to the second challenge question including a second valid response and at least one invalid response. At least the second challenge question and the second valid response are based at least in part upon data of the consumer's account. The second challenge question and the response options including the second valid response are transmitted to the second POS device before the second transaction has been completed for presentation to the consumer through the second POS device. The consumer can answer the second challenge question and allow the second merchant to verify the consumer's identity based at least in part upon whether the second valid response is selected.

In a single or multiple embodiments, different accounts of an online social network or different accounts at different online social networks are utilized. For example, in one embodiment in which the intermediate computer is in communication with respective computers hosting respective online social network sites at which the consumer has respective accounts, the intermediate computer receives a request by a second POS device of a second merchant for verification of the consumer's identity and determining a second challenge question different from the first challenge question. The intermediate computer also determines options for responding to the second challenge question comprising a second valid response and at least one invalid response. At least the second challenge question and the second valid response are determined by the intermediate computer based at least in part upon data of a second account the consumer has with the second online social network site. The intermediate computer transmits the second challenge question and the response options including the second valid response to the second POS device before the second transaction has been completed for presentation to the consumer through the point of sale terminal to allow the consumer to answer the second challenge question and allow the second merchant to verify the consumer's identity based at least in part upon whether the consumer selects the second valid response.

Further, embodiments involving multiple consumer accounts at respective online social network sites may involve the intermediate computer determining which of the first and second social network sites to use to determine the challenge question and response options. For example, this determination may be based at least in part upon which online social network site includes the most recent activity by the consumer (e.g., a most recent update) or how many consumers that are registered with the intermediate computer have accounts with respective online social network sites. Further, embodiments may involve the intermediate computer utilizing one online social networking site account to determine challenge questions and response options for a first pre-determined number of transactions, and another account the consumer has with another social networking site to determine challenge questions and response options for a second pre-determined number of transactions. Other embodiments involve utilizing one account for a first time (e.g., a day, week or month), and another account for another time (e.g., next day, next week, next month), thus alternating using different accounts.

In a single or multiple embodiments, a challenge question may have multiple valid response options, one valid response option being based on data of a consumer's account with one online social network site, whereas another valid response option is based on data of a consumer's account with another online social networking site. The intermediate computer can retrieve or access and aggregate data from multiple online social network sites and derive a challenge question involving a valid response option from online social networking site or multiple online social networking sites.

Embodiments may involve a consumer answering a single challenge question or multiple challenge questions, such that in order to make a determination that a consumer's identity has been verified, the consumer must answer a pre-determined minimum number of challenge questions correctly.

In a single or multiple embodiments, the challenge question and valid response change or are dynamic such that a determined challenge question and a valid response apply for transactions occurring during a date or range of dates, but then a different challenge question and valid response are used for transactions occurring during a different date or range or dates. Question and response changes, in other embodiments, may be based at least in part upon the intermediate computer determining or receiving an update made to the consumer's account and/or based at least in part upon data of the account being posted or dated within a pre-determined time before a date that the transaction was initiated.

In a single or multiple embodiments, the valid response is selected from the consumer's account with the social networking site, and the at least one invalid response being selected from another account of the social network, such as an account of another user of the social network that is not an online social connection of the consumer, or a connection of a connection of the consumer. In certain embodiments, invalid responses are selected from a non-connection account when the consumer and the non-connection user are separate from each other by a pre-determined minimum degree or pre-determined minimum number of connections with in the online social networking site, e.g., a minimum of three degrees of separation. In this manner, embodiments select invalid responses in a manner such that the consumer is more likely not to recognize the invalid response, thus improving the reliability of verification when, for example, the consumer is presented with a series of challenge questions and the consumer can correctly distinguish and select the valid response from the invalid ones. In other embodiments, one or more invalid response are selected by the intermediate computer from outside of the online social network. For example, the intermediate computer may execute an internet search independently of the social networking site and select random content items as invalid responses.

In a single or multiple embodiments, a valid response option is selected from the consumer's social network account based at least in part upon when online activity within the consumer's account occurred or when that content item was created or posted to the account. For example, a content item may qualify as a valid response based at least in part upon the online activity involving the content item occurring within a pre-determined number of days before the transaction or how often the content item is involved in online activity.

In a single or multiple embodiments, the challenge question and response options involve a content item in the form of a photograph, e.g., a photograph posted to facebook.com or pinterest.com. For example, a valid response option may be a photograph that was taken by the consumer and posted to the consumer's account, or a photograph taken by the consumer or an online social connection of the consumer in which the consumer is tagged. Challenge questions and response options may also involve content in the form of audio and video files, e.g., a valid response may be a recently purchased song or movie, or selected based on how often the consumer plays or listens to a song or movie or other attributes thereof. Response options may also involve content in the form of electronic check-ins, e.g., using a mobile application of FOURSQUARE social networking service.

Challenge questions and response options may also be structured such that response options involve the same type of content items. For example, challenge question derived from the consumer's account may be "Where did you recently visit?" and the response options presented to the consumer may be four photographs from which the user can select one photograph taken by the consumer at the visited location. As another example, this same exemplary challenge question may involve a mixture of different types content items such as photographs and data of electronic check-ins.

Response options may involve names of online social network connections or events about online social network connections. For example, response options may include a plurality of names, a valid response corresponding to a name of an online social network connection of the consumer, whereas invalid response options are not online social network connections of the consumer. For example, an invalid responses may be a name of a connection of a consumer's connection, or a name of a connection of a connection of a consumer's connection.

In one or more embodiments, invalid response options may be content items randomly generated by the intermediate computer or selected from internet searches. For example, in one embodiment involving names of online social network connections, response options are selected based at least in part upon respective probabilities whether the consumer will recognize respective response options, wherein the valid response is associated with a probability that is greater than a pre-determined minimum threshold probability, and the at least one invalid response is associated with a probably that is less the pre-determined minimum threshold probability. Probabilities may be based at least in part upon a degree of connection or separation of the consumer with other users within the online social network, e.g., whether a direct connection (high degree or likelihood of recognition), or an indirect connection and how many degrees or levels of separation exist between the consumer and other users.

In one or more embodiments in which the form of payment tendered is a payment card such as a credit card, the intermediate computer, serving as an acquirer or intermediate payment processor, is also in communication with a computer of an issuer of the payment card, e.g., a computer of an issuer such as VISA or MASTERCARD issuers. In these embodiments, the intermediate computer also communicates with the issuer computer, which performs its standard authorization process, and the intermediate computer receives authorization data or an authorization code generated by the issuer computer that indicates whether the consumer having sufficient credit for the transaction or whether the credit card is approved for the transaction. In addition to transmitting one or more challenge questions and respective response options, the intermediate computer also transmits the authorization data to the point of sale terminal. In one embodiment, in which a challenge question and response options are transmitted to the merchant's POS device, the authorization data is transmitted together with the challenge question and response options. Thus, with embodiments, while traditional issuer processing may authorize use of the credit card, the merchant may decline to proceed with the transaction when, for example, the consumer fails to select the valid response in response to one or more challenge questions thus calling into question the identity of the consumer.

In a single or multiple embodiments, the intermediate computer receives the request from the POS device, and in response to the request, accesses data of the consumer's account. The consumer's account data may have been previously retrieved and stored and is then accessed in response to the request, or the intermediate computer may connect to the computer hosting the online social networking site to access or retrieve data of the consumer's account in response to the request, and then determine one or more challenge questions and response options, which are transmitted to the merchant POS device or the consumer's mobile communication device before the transaction has been completed.

BRIEF DESCRIPTION OF THE DRAWINGS

The foregoing and other aspects of embodiments are described in further detail with reference to the accompanying drawings, wherein like reference numerals refer to like elements and like element descriptions are applicable for all described embodiments where relevant:

FIG. 9 illustrates types of data that a database of an intermediate computer can store for determining and accessing an account consumer has with an online social networking site according to one embodiment;

DETAILED DESCRIPTION OF ILLUSTRATED EMBODIMENTS

Embodiments are directed to confirming that the consumer that has tendered a payment instrument to purchase a good or service is the person named on the payment instrument, and to assist merchants to verify consumer identities during a transaction (e.g., before the good is handed over to the consumer or the service performed). Embodiments are also directed to reducing fraud involving payment instruments and reducing consumer and merchant losses resulting from fraud.

Figure 1:
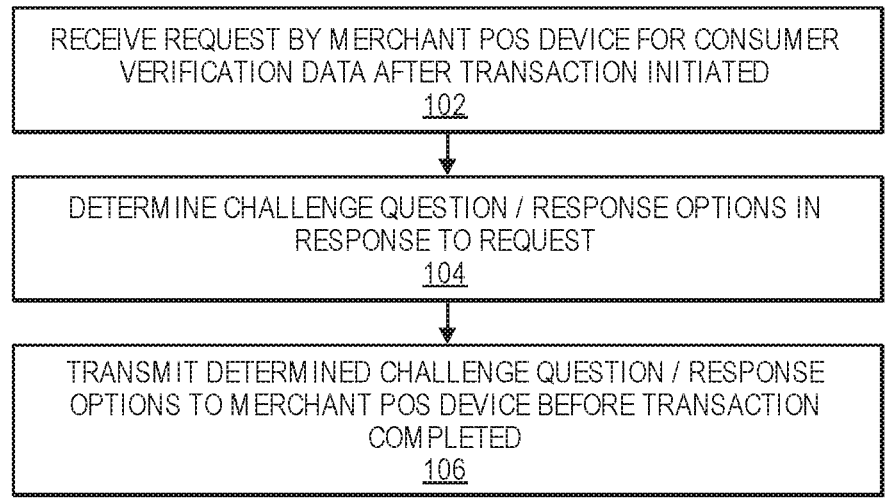
FIG. 1 is a flow diagram illustrating one embodiment of a method for determining a challenge question and response options to the challenge question to be presented to a consumer during a transaction.

Referring to FIG. 1, in a method according to one embodiment, at 102, an intermediate computer or payment processor computer receives a request by a Point of Sale (POS) device of a merchant for data to be used to verify an identity of a consumer, or that the consumer is the person named on a tendered payment instrument. At 104, the intermediate computer, in response to the request, determines a challenge question and one or more response options, and at 106, transmits the determined challenge question / response options to merchant POS device for use by the merchant to verify the consumer's identity based on how the consumer answers the question before the transaction has been completed.

Figure 2:
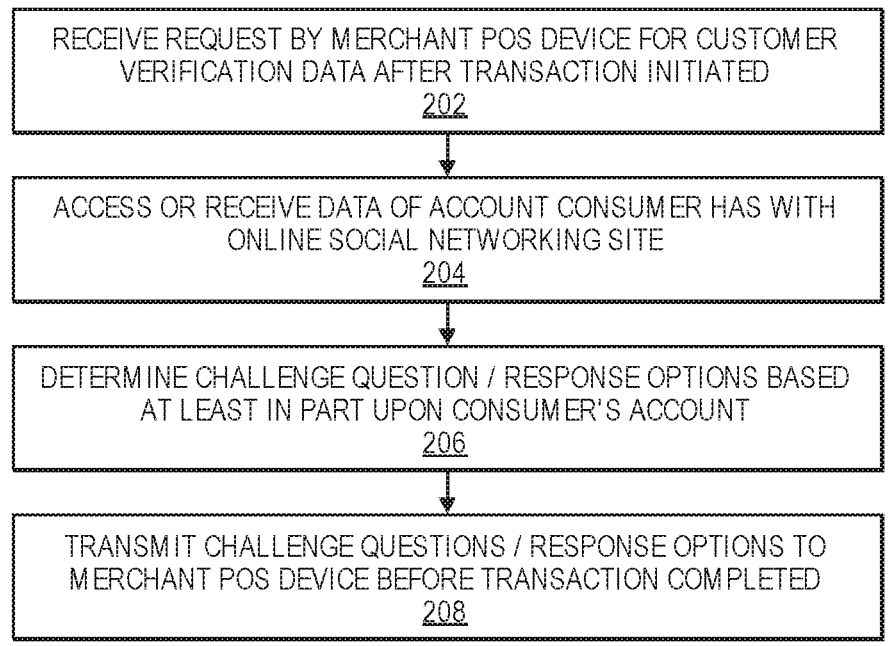
FIG. 2 is a flow diagram illustrating one embodiment of a method for determining a challenge question and response options based at least in part upon data of an account a consumer has with an online social networking site and that are to be presented to a consumer during a transaction.

Referring to FIG. 2, in a method according to one embodiment, at 202, the intermediate computer receives a request by the merchant POS device for consumer verification data, and at 204, accesses or receives data of an account the consumer has with one or more online social networking sites, examples of which include FACEBOOK, MYSPACE, FOURSQUARE, PINTEREST, GOOGLE+and LINKEDIN social networking sites (facebook.com, myspace.com, foursquare.com, pinterest.com, plus.google.com, linkedin.com) (generally, online social networking site). At 206, the intermediate computer determines a challenge question and response options based at least in part upon consumer's account with an online social networking site, and at 208, before the transaction has been completed, transmits the challenge question and response options to the merchant POS device for use by the merchant to verify that the consumer is the person named on the tendered payment instrument based on how the consumer answers the question.

Figure 3:
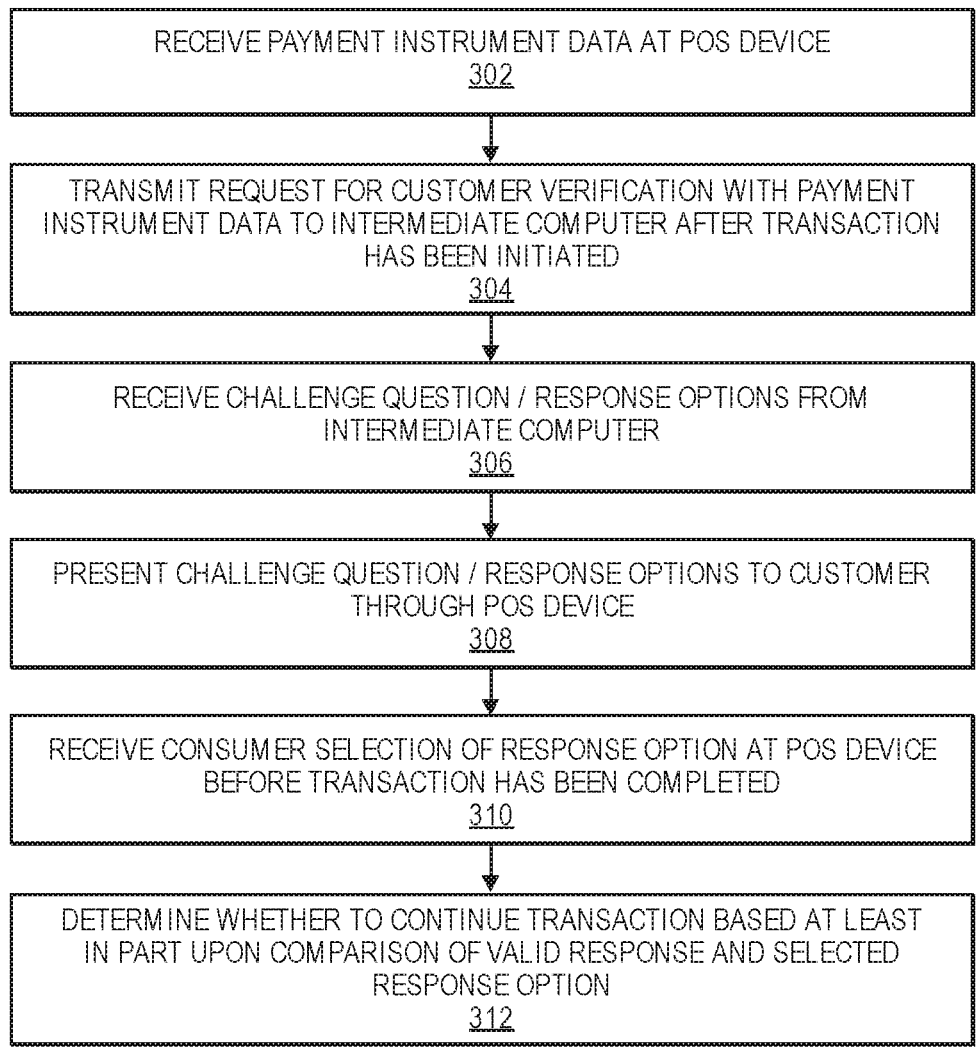
FIG. 3 is a flow diagram illustrating one embodiment of a method for verifying a consumer's identity by requesting a challenge question and response options during a transaction from an intermediate computer that determines the challenge question and response options in response to the request and receiving a consumer's answer to the challenge question.

Referring to FIG. 3, in another embodiment, from the perspective of the merchant POS device, at 302, the merchant POS device reads or receives data of a payment instrument tendered by the consumer, and at 304, transmits a request for consumer verification data and data of the tendered payment instrument to the intermediate computer after the transaction has been initiated, but before the transaction has been completed. At 306, after the intermediate computer has determined a challenge question and response, the challenge question and response are transmitted to and received by the merchant POS device, and at 308, the challenge question and response options are presented to the consumer through the POS device, e.g., through a display of the POS device. At 310, the merchant POS device receives consumer input selecting a response option at the POS device, and at 312, this data is used to determine whether to continue transaction based at least in part upon comparison of valid response and selected response option.

Figure 4:
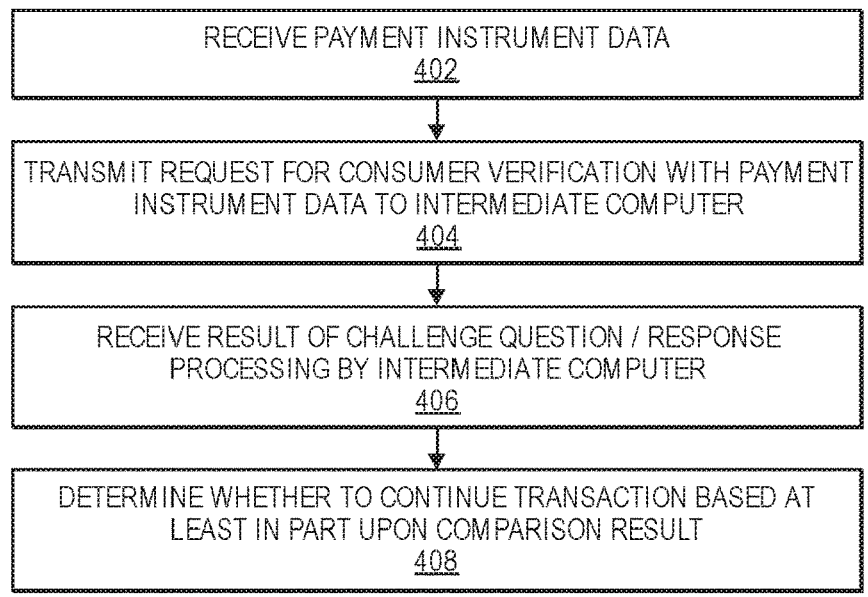
FIG. 4 is a flow diagram illustrating one embodiment of a method for verifying a consumer's identity by requesting a consumer identity verification data from an intermediate computer that determines the challenge question and response options, receives the consumer's answer and transmits verification data comprising a comparison result to the merchant's point of sale device.

Referring to FIG. 4, in another embodiment, rather than the merchant POS device receiving the challenge question and response options for presentation to the consumer, the POS device instead receives a result of a comparison of the consumer's selection of a response option and a valid response performed by the intermediate computer, e.g., when the consumer receives the challenge question from and responds to the question with a response the intermediate computer rather than the merchant POS device. Thus, at 402, the merchant POS device receives data of the payment instrument tendered by the consumer, and at 404, transmits a request for consumer verification and data of the payment instrument to the intermediate computer which, determines the challenge question and communicates with the consumer such that, at 406, the result of the analysis performed by the intermediate computer is transmitted to and received by the merchant POS device. At 408, the result is used to determine whether to continue transaction.

Figure 5:
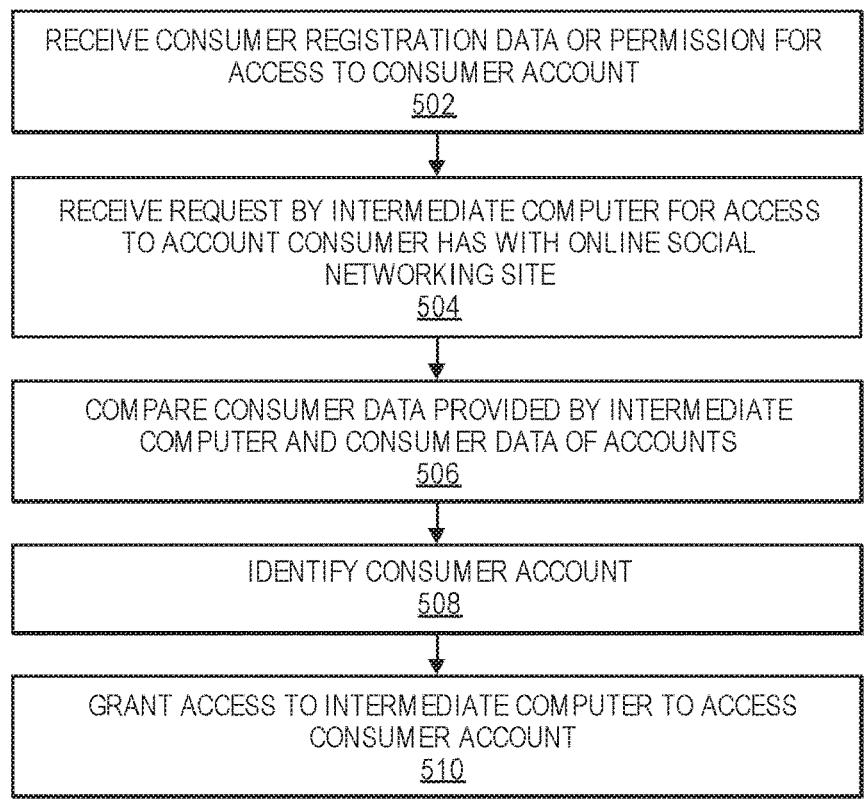
FIG. 5 is a flow diagram illustrating one embodiment of a method for providing access to an account a consumer has with an online social networking site for purposes of real time verification of the consumer's identity during a transaction.

Referring to FIG. 5, in another embodiment, from the perspective of a computer hosting an online social networking site with which the consumer has an account, at 502, the host computer receives consumer registration data or permission granted by the consumer for the intermediate computer to access the consumer's account with the online social networking site, and at 504, receives a request by the intermediate computer to access the consumer's account. At 506, the host computer compares data provided by the intermediate computer to determine whether the intermediate computer has identified an account for that consumer. If so, and at 508 the consumer account is identified by the host computer, at 510, the host computer grants the intermediate computer access the consumer's account for purposes of accesses or retrieving data to derive a challenge question and options for responding to the question.

Various embodiments and further aspects thereof are described in further detail below with reference to FIGS. 6-24.

Figure 6:
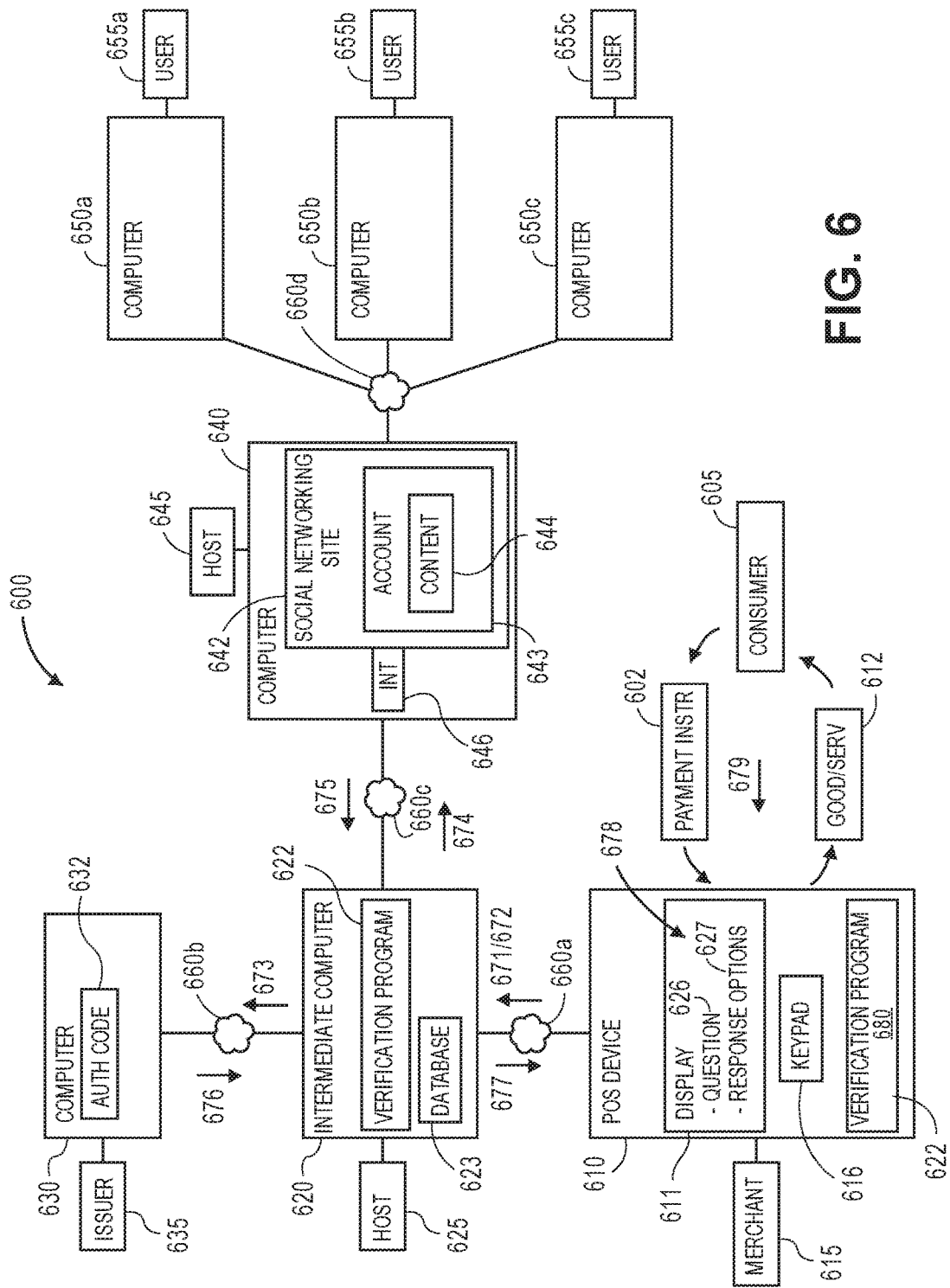
FIG. 6 illustrates components of a system constructed according to one embodiment in which, before a transaction has been completed, a merchant requests data for verifying a consumer's identity, an intermediate computer determines a challenge question and response options, challenge question and response options are presented to the consumer, and an answer is received, through the merchant's point of sale device.

Referring to FIG. 6, components of a system 600 constructed according to one embodiment for use in verifying an identity of a consumer 605 during a transaction involving the consumer 605 and a merchant 615 comprises or involves one or more or all of a payment processing device or point of sale (POS) device or terminal 610 (generally, POS device) of the merchant 615 that is in communication with an intermediate computer 620 of an intermediate host 625 such as Intuit Inc., Mountain View, California, In certain embodiments, the intermediate computer 620 is an acquirer financial institution (FI) that serves as an intermediate processor between the merchant 615 and an issuer 635 of a payment instrument 602 ("payment instr" in FIG. 6), which may be physical or electronic payment instrument.

In the illustrated embodiment, when the intermediate host 625 is an acquirer, the intermediate computer 620 is also in communication with a computer 630 of the issuer 635, and a computer 640 of a host 645 (social network host) managing an online social networking site 642. As generally illustrated in FIG. 6, users 655a-c (generally user 655, including the consumer 605) of the online social networking site 642 access the site by executing browsers on respective computers or other computing devices 650a-c to access their accounts 643. Accounts user profiles and data of online account activities or online social networking site content items 644.

In the illustrated embodiment, the consumer 605 desires to purchase a good or service 612 from the merchant 615, and has tendered a physical payment instrument 602 (other than cash) to the merchant 615. The payment instrument 602 may be a payment card, such as a credit card, or debit card, gift card, or other card that can be used for payment. The payment instrument 602 may also be a negotiable instrument such as a check.

Figure 7:
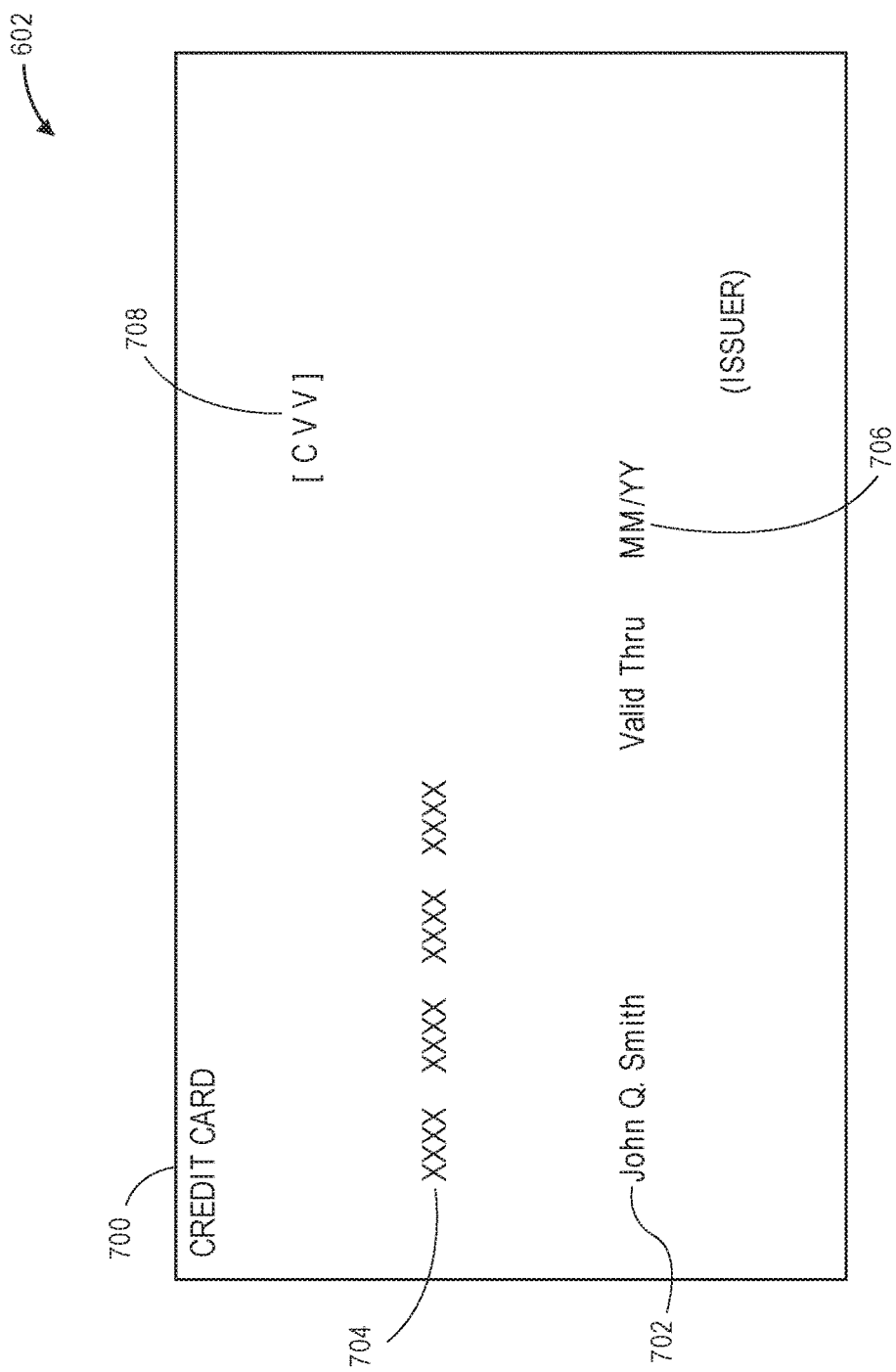
FIG. 7 generally illustrates static data printed on a payment instrument in the form of a credit card.

Referring to FIG. 7, a credit card 700, for example, includes various types of printed, static or fixed, information including a name 702 of the card holder, credit card number 704, expiration date 706 and card verification value (CVV) data 708, which is sometimes printed on the back of the credit card 700. Other payment instruments 602 may have similar printed, static or fixed, information. For example, a debit card includes a printed name and card number, and a check includes printed information including a name, address, account number and routing number. Other information printed on a check is not static in that it changes as checks are used, namely, check numbers. For ease of explanation, and not limitation, reference is made to a payment instrument 602 or credit card 700 as one example of a payment instrument that may be utilized in embodiments.

According to one embodiment, the merchant 615 is a brick-and-mortar merchant that offers goods or services 612 for sale from a physical merchant location or store, and utilizes an in-store POS device 610 that accepts credit cards 700 or other payment instruments, or through which credit cards 700 can be swiped in order to read data of the credit card 700. Data can be read from an encoded stripe or chip on the credit card 700. While reference is made to a POS device 610 for ease of explanation, it will be understood that the POS device 610 can be credit card terminal, a computer or other computing device capable of accepting various forms of electronic payment. For example, the merchant 615 may be a mobile merchant or a merchant that can execute transactions using a mobile communication device such as a smartphone or tablet computing device capable of wireless or cellular communications rather than using an in-store POS device 610. For this purpose, the mobile communication device of the merchant 615 may execute a mobile payment application such as GO PAYMENT mobile payment application available from Intuit Inc. and include a credit card reader through which a credit card 700 can be swiped in order to read credit card data. Merchants 615 may utilize a mobile communication device in-store or at other locations. Whatever form of payment device is utilized, as generally illustrated in FIG. 6, the POS device 610 includes a display 611 and an input element 616, such as a keypad or touchscreen input element incorporated into the display 611.

As will be described in further detail below, the POS device 610 and/or intermediate computer 620 hosts a consumer verification program 622. At least the intermediate computer 620 hosts or accesses a database 623 for consumers 605 that have registered with the intermediate host 625 for purposes of verifying consumer identities during transactions according to embodiments. The consumer verification program 622 is operable to determine one or more challenge questions 626 and respective response options 627, at least one of which is a correct or valid response. In the embodiment illustrated in FIG. 6, and as will be described in further detail below, challenge questions 626 and response options 627 are determined by the verification program 622, transmitted to the POS device 610, and presented to the consumer 605 through the POS device display 611.

The online social networking site 642 may host accounts 643 of various users 655 and may provide an interface 646 for access to same. Examples of online social networking sites 642 include, for example, facebook.com, linked.com, myspace.com, twitter.com and foursquare.com. Online social networking sites 642 include a website or other online forum that allows registered users 655 to generate profiles from within the website and that reflect relationships or electronic, online social connections with other users of the website. These electronic, online social connections may be in the form of "friends" as in facebook.com, "connections" as in linkedin.com, or "following" and "followers" as in twitter.com. Online social networking sites 642 may also provide a type of timeline based presentation of content items, which may be based on year, month and more specific times such as date and hour. For example, facebook.com utilizes a reverse chronological timeline summary or interface. Online social networking sites 642 may also allow registered users 655 to post various types of data or content 644 within their accounts 643 or profiles including photographs, remarks or "tweets" as in twitter.com, links to other websites. Users 655 may post comments about where these photographs were taken and their subjects. Further, a user 655 can "tag" or identify that user or other users appearing with the photograph. Other online social networking sites 642 allow users 655 to electronically check-in to locations using their mobile communication devices. For example, a user 655 may download an application onto their mobile communication device such that when they visit a restaurant or other destination, the consumer "electronically checks in"

at the restaurant or destination, and this electronic check-in is posted to the foursquare.com site to share with others to see.

Online social network sites 642 also provide various application programming interfaces (APIs) or generally, interfaces 646 ("INT" in FIG. 6), for external access to their sites. For example, facebook.com provides a service that allows for identification of a registered user 655 by performing a reverse lookup of a cell phone or unlisted number or an e-mail address of that registered user 655. For ease of explanation, reference is made generally to an online social networking site 642, interface 646 to user accounts 643 thereof, and online activity, content or content items 644 within a user's account 643 of that online social networking site 642.

In the illustrated embodiment, the intermediate computer 620, acting as an acquirer for a credit card transaction, is also in communication with a computer 630 of the issuer 635, e.g., through a card network. Examples of issuers 635 include CITI and BANK OF AMERICA, and as is known, acquirers send requests to issuers 635 to authorization the transaction using the credit card 700, and when authorized, generate an authorization code 632 that is sent back to the intermediate computer 620 of the acquirer.

Components described above are in communication with each other through one or more networks 660*a-d* (generally, network). Examples of these networks 660 and other networks discussed herein that may be utilized for communications between system components include but are not limited to a Local Area Network (LAN), a Wide Area Network (WAN), Metropolitan Area Network (MAN), a cellular network, a wireless network, the Internet, a proprietary network, other suitable networks capable of transmitting data, and a combination of such networks, and in the case of acquirer-issuer communications, this may be done through a card network. For ease of explanation, reference is made to a network generally, but various networks, combinations of networks and communication systems, methods and protocols may be utilized. Further aspects of system components are described in further detail below with reference to FIGS. 8-25.

Figure 8:
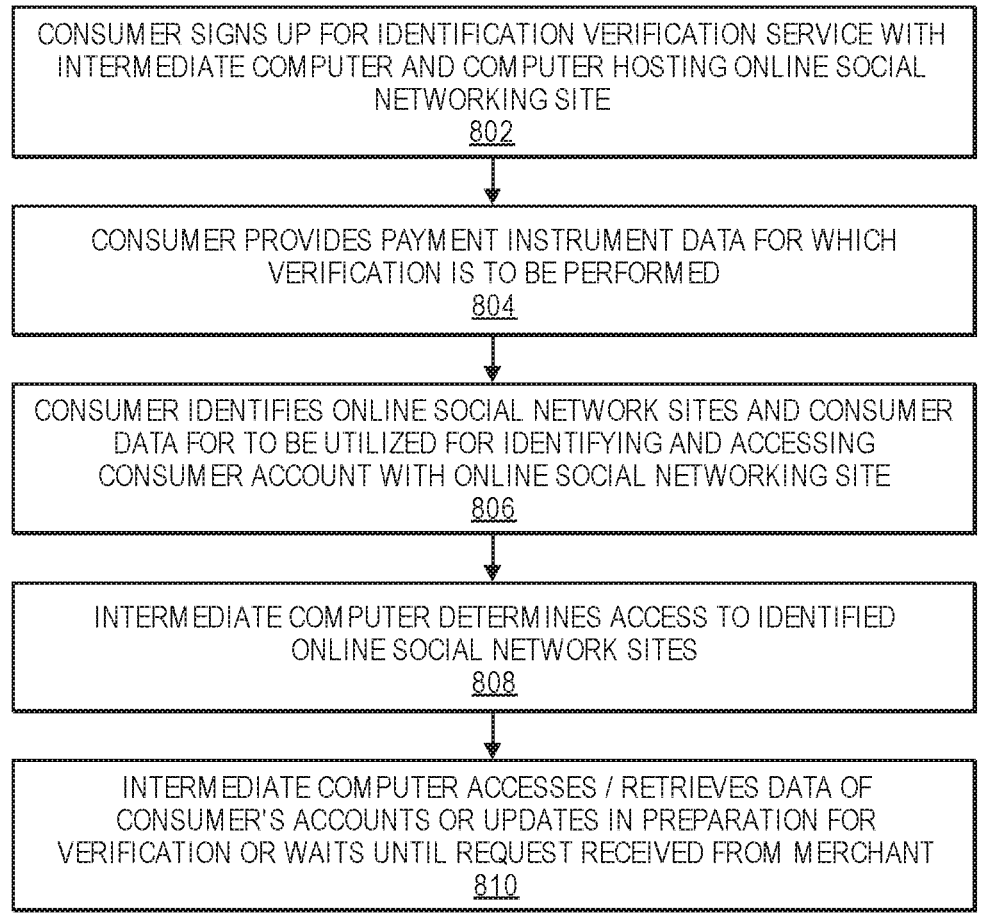
FIG. 8 is a flow diagram illustrating how a consumer signs up for an identity verification service with one or more of the intermediate host of an intermediate computer and a host of the online social networking site with which the consumer has an account.

Referring to FIG. 8, before the consumer 605 initiates a transaction to which embodiments are applied, the consumer 605 registers or signs up for a fraud prevention or identification verification service executed by the verification program 622 and offered by the intermediate host 625. For this purpose, at 802, the consumer 605 may sign up for or register with the intermediate computer 625 and/or grant permission to or authorize the intermediate computer 625 to access the consumer's account 643 with the online social networking site 642 or configure the account 643 to grant access by the intermediate computer 620. As part of this process, at 804, the consumer 605 provides static data of payment instruments 602 that are to be processed by the identification verification program 622, and at 806, identifies the online social network sites 642 at which the consumer 605 has accounts 643 and that are to be accessed and utilized for identity verification by the verification program 622. At 808, as necessary, the intermediate computer 620 determines how to access identified online social network sites 642 and consumer accounts 643 thereby, e.g., via an API or interface 646 that can identify a registered user through consumer data in the form of a cell phone number of e-mail address, or other login information that may be required in order to access the consumer's account 643. For this purpose, the intermediate computer 620 maintains the database 623 of consumer data that is used to at least access the online social networking site 642 through the interface 646, and other log in information as needed in order to access the consumer's account 643 hosted thereby.

Referring to FIG. 9, the intermediate computer 620 may host the database 623 with a table or other data structure 900 for each registered user or consumer 605 including (in columns 902*a-g*) data such as the consumer's first name, last name, consumer data used to access the online social networking site 642 via the interface 646 and/or consumer account 643 such as the consumer's phone number, e-mail address and other log in information as needed, and identification or web address of the online social networking site 642 with which the consumer 605 has an account 643.

Figure 10:
FIG. 10 illustrates types of data that a database of a computer hosting an online social networking site may maintain for searches performed by the intermediate computer to determine challenge questions and response options according to one embodiment.

Referring to FIG. 10, the consumer's account 643 with the online social networking site 642 will also have a table or other data structure 1000 including some of the same information. As generally illustrated in FIG. 10, the table or other data structure 1000 may identify (in columns 1002*a-e*), the user or consumer 605 and may include the common cross-reference consumer data such as phone number and/or email address, and account data reflecting online activities performed by the consumer 605 in that account 643.

Thus, when as described in further detail below, the intermediate computer 620 receives data of a tendered credit card 700 (such as the name 702 on the credit card 700 or other static printed information), the intermediate computer 620 can access the database 623 to search for that name in the table 900, identify within the table 900 associated consumer data in other linked columns such as e-mail address and/or phone number, and use this consumer data and other login data as needed to access the consumer's account 643 through the interface 646.

Referring again to FIG. 8, at 810, before any transaction is initiated, or in response to a request by the POS device 610 following initiation of a transaction, the intermediate computer 620 accesses the consumer's account 643, reads consumer account data or content 644 or retrieves consumer account data or content 644 and stores it to the database 623. Step 810 may be performed after the consumer 605 has completed registration, periodically thereafter (e.g., to ensure that the intermediate computer 620 has updated account data 644 reflecting recent online activity within the online social networking site 642), or in response to a request by the POS device 610 after a transaction has been initiated, but before the transaction has been completed.

Having described aspects of system components and how they are in communication with each other, and how a consumer 605 may register with the intermediate computer 620 to participate in the fraud detection or identification verification service, embodiments are described in further detail with reference to FIGS. 11-25, which describe how embodiments may be implemented to determine challenge questions 626 and response options 627 in real time, during a transaction, before the transaction has been completed, based at least in part upon the data or content 644 of the consumer's account 643 accessed by the intermediate computer 620.

Figure 11:
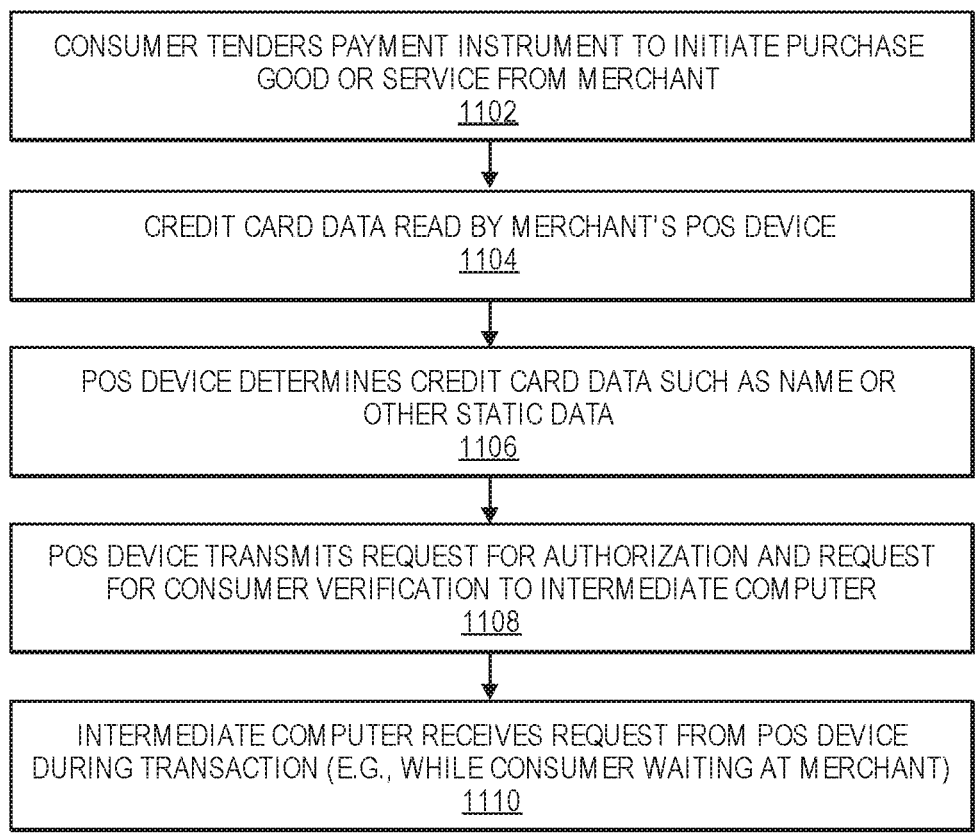
FIG. 11 is a flow diagram illustrating steps performed by a merchant point of sale device following tendering of a form of payment by a consumer according to one embodiment.

With continuing reference to FIG. 6, and with further reference to FIG. 11, one embodiment involves presenting challenge questions 626 and response options 627 to the consumer through the POS device 610 (as illustrated in FIG. 6). At 1102, the consumer 605, within a merchant store at an in-store POS device 610 or dealing with a mobile merchant, tenders a payment instrument 602 to purchase a good or service 612 from the merchant 615. As noted above, one example of a payment instrument 602 is a physical credit card 700, but it will be understood that other payment instruments 602 may be utilized. Tendering a credit card 700 may alternatively involve a consumer 605 utilizing the consumer's mobile communication device (not shown in FIG. 6) as a mobile wallet, which may involve establishing a wireless connection (e.g., Near Field Communication) (NFC) connection with the merchant's POS device 610 to communicate credit card information from the mobile wallet.

At 1104, the credit card 700 is swiped through a card reader of the POS device 610 or otherwise red, and credit card data is communicated to the POS device 610, and at 1106, the POS device 610 determines static credit card 700 data such as name 702, account number 704, expiration date 706 and/or CVV code 708 (which is static for the duration of the validity of the credit card 700).

At 1106, the verification program 622 executing on the POS device 610 receives the credit card data and, in embodiments in which the intermediate computer 620 serves as an acquirer, transmits a request 671 for issuer authorization and a request 672 for consumer verification to intermediate computer 620 at 1108. At 1110, the intermediate computer 620 receives the requests by the POS device 610 during the transaction, which is defined as referring to after the consumer 605 has tendered payment instrument 602, but before the consumer has taken delivery of or received the good or service 612, and before any receipt or purchase confirmation has been generated by the POS device 610. Thus, the consumer 605 is waiting at merchant's POS device 610 while the transaction is being processed. Accordingly, before the transaction has been completed is distinguished from subsequent backend processing by the acquirer and issuer 635 as part of card network processing, and instead involves the interaction between the merchant 615 and the consumer 605.

The requests 671/672 may be transmitted by the POS device 610 in a single message or different messages. In other embodiments in which the intermediate computer 620 services to verify consumer identities but does not serve as an acquirer, the verification program 622 may transmit one message with a request 671 for authorization to a separate acquirer computer (not shown in FIG. 6) and a separate message with a request 672 for data to verify the consumer's identity to the intermediate computer 620. For ease of explanation, reference is made to the system configuration and communications illustrated in FIG. 6 in which the intermediate computer 620 is also in communication with a computer 630 of the issuer 635 of the tendered credit card 700.

Figure 12:
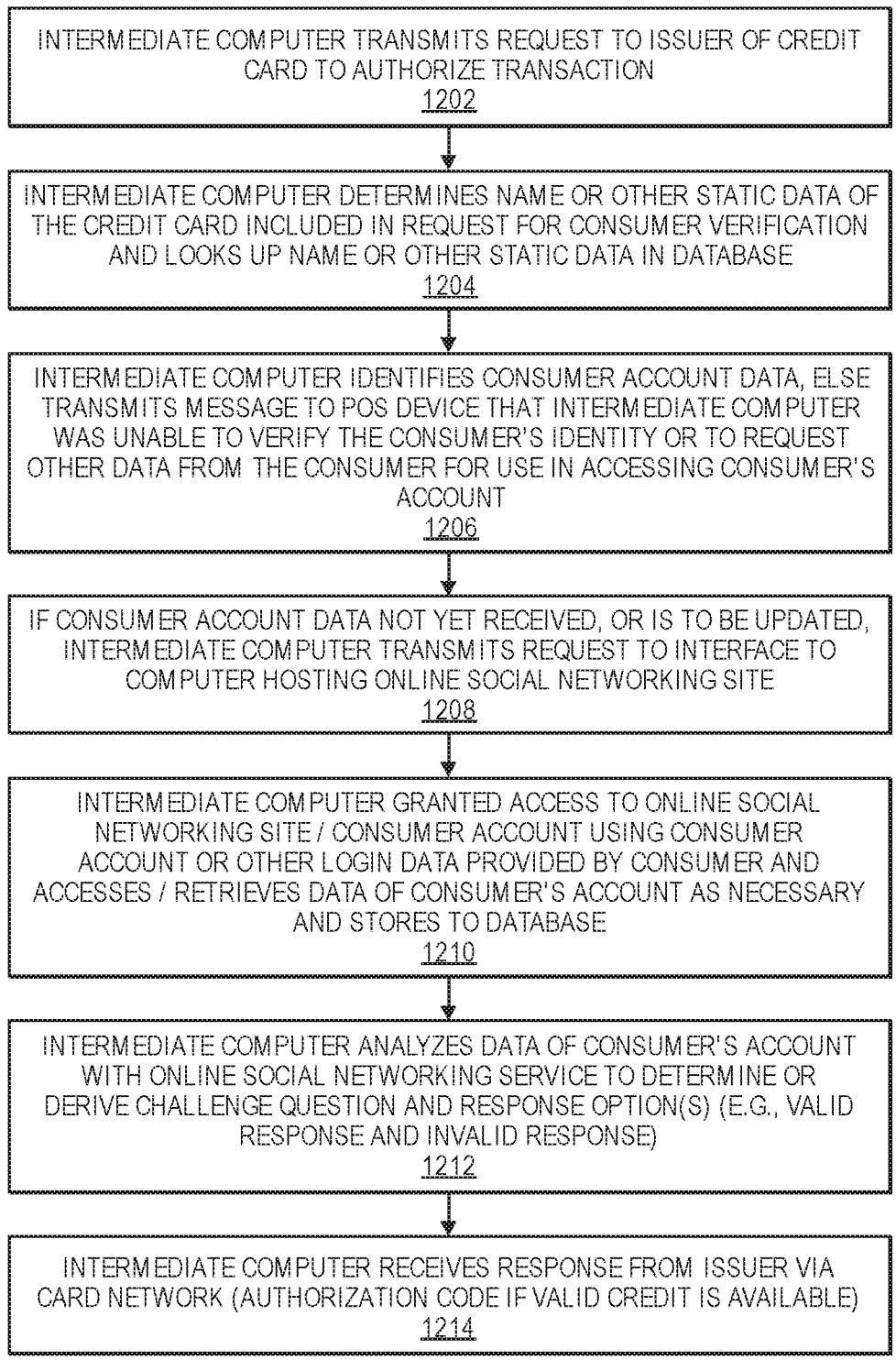
FIG. 12 is a flow diagram illustrating steps performed by an intermediate computer in response to receiving a request by the merchant point of sale device to determine a challenge question and response options based at least in part upon data of an account the consumer has with an online social networking site according to one embodiment.

Referring to FIG. 12, at 1202, in response to receiving the requests 671/672, the intermediate computer transmits a request 673 to the computer 630 of the issuer 635 of the credit card 700 to authorize transaction (e.g., through a card network such as VISA or BANK OF AMERICA card network), and at 1204, determines the name 702 or other static data of the credit card 700 from the request 672 by the POS device 610 and searches the database 623 for the name 702 or other static data. At 1206, the verification program 622 locates the name 702 with the database 623 and identifies associated consumer data (e.g., e-mail address and/or phone number as shown in FIG. 9), else transmits a message to POS device 610 that verification program 622 was unable to verify the consumer's identity using a social network account.

At 1208, when the intermediate computer 620 is able to locate the consumer's record in the database 623, and if consumer account data has not yet been received by the intermediate computer 620 or is to be updated, the intermediate computer 620 transmits a request 674 to the interface 646 to the computer 640 hosting online social networking site 642 to access the site and the consumer's account 643 hosted thereby. For this purpose, for example, the interface 646 may be an API to facebook.com that receives as an input phone number or e-mail address provided by the verification program 622 to identify the registered user with that phone number or e-mail address. At 1210, the intermediate computer 620 is granted access to online social networking site and consumer account 643 hosted thereby using the same or other consumer data for logging into the account 643, and accesses or retrieves 675 data or content 644 of the consumer's account 643 and stores the account data or content 644 to the database 623. At 1212, the verification program 622, if not already done before the transaction was initiated, analyzes the data or content 644 to determine or derive one or more challenge questions 626 and one or more corresponding response option(s) 627.

Figure 13:
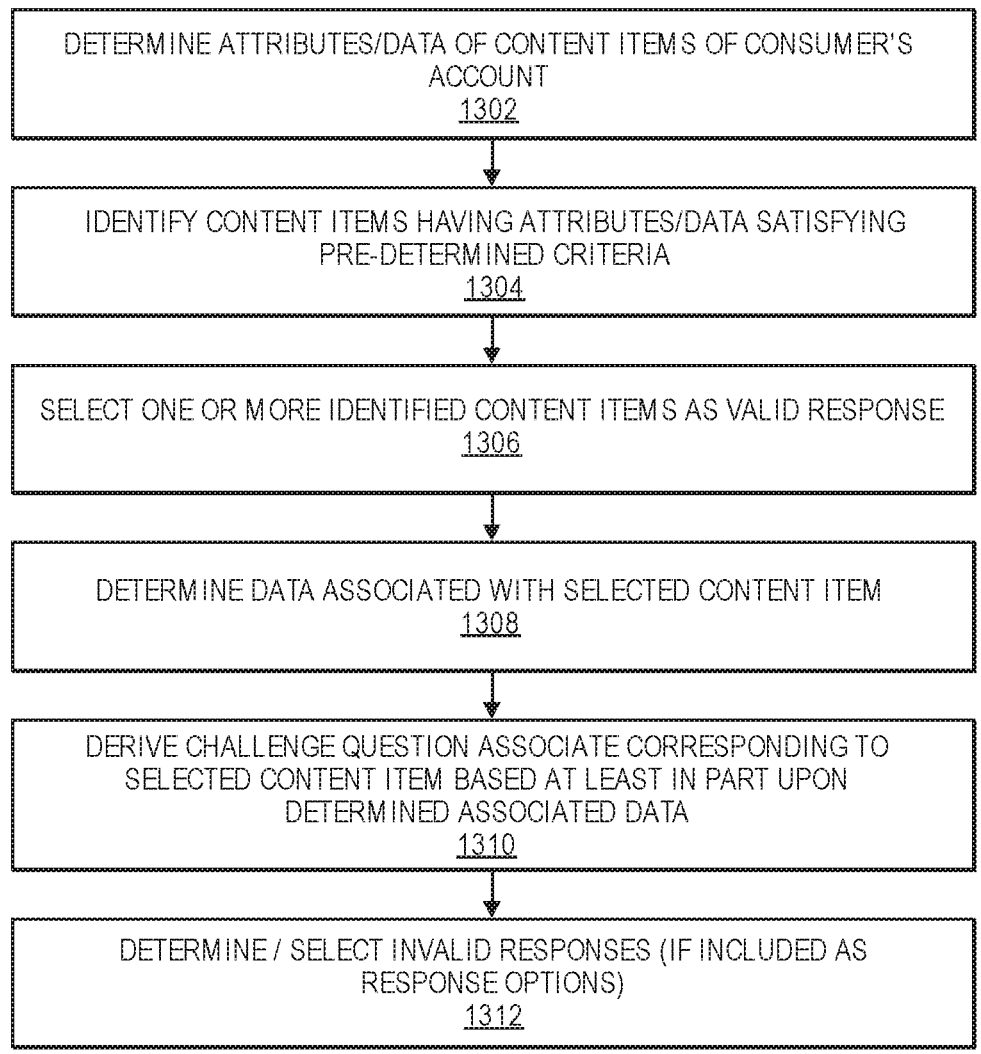
FIG. 13 is a flow diagram illustrating how a challenge question and response options that are to be presented to a consumer during a transaction are determined according to one embodiment.

Referring to FIG. 13, the verification program 622 determining or deriving one or more challenge questions 626 and one or more response options 627 comprises, at 1302, determining attributes or data of content items 644 retrieved from the consumer's account 643 with the online social networking site 642. The attribute or data may vary depending on the type online social network site 642 or other online account 643 involved, the type of content item 644 or online activity that occurred.

For example, the consumer 605 may post one or more photographs to an account 643, e.g., to a page or wall of the online social networking site 642 for other users to view and comment upon. The consumer 605 may have noted what object or which people were photographed, or where the photograph was taken. There may also be data of when the photograph was posted. The photograph may be tagged with names of other users of the online social networking site 642 that appear in the photograph. The consumer 605 may have also posted remarks concerning an event at which the photograph was taken (e.g., a birthday party, wedding, etc.) These data are attributes of the photograph content item. As another example, the consumer 605 may have content items 644 in the form of friends or online social connections, and attributes or data thereof may involve connection names or new connections or when connections were made, or which connections posted a message to the consumer's page or wall. As yet another example, the online social networking site 642 such as facebook.com may allow a user to "Like" certain content 644, websites, stories or other information presented through the online social network website 642. Attributes or data of these content items 642 may be the subject matter or title that was "liked" or when it was "liked." As a further example, the online social networking site 642, such as twitter.com, includes content items 644 in terms of who a consumer 605 is following and who is following the consumer 605, and attributes or data thereof may be the names or identities of people the consumer 605 is following, a name of a person a consumer 605 recently decided to follow, names or identities of people following the consumer 605, or a name of a person that recently decided to follow the consumer 605. As a another example, with an online social networking site 642 such as foursquare.com, content items 644 may be electronic check-ins posted to the consumer's account 643, wall or profile, and attributes or data thereof may be the name of a location (such as a restaurant, museum) at which the consumer 605 visited and electronically checked in, when the electronic check-in occurred, or a name of an award or mayorship earned as a result of electronic check-ins. Accordingly, attributes or data of content items 644 may identify a person, a location, an event, a date, or other aspects of online activity.

With continuing reference to FIG. 13, having retrieved the consumer's account data and identified content items 644 and attributes or data thereof, at 1304, the verification program 622 compares the attribute or data of content items 644 and pre-determined criteria. According to one embodiment, pre-determined criteria serves to filter content items such that the resulting identified or selected content items 644 are more likely to be recognized by the consumer 605 as being content of the consumer's account 643.

Figure 14:
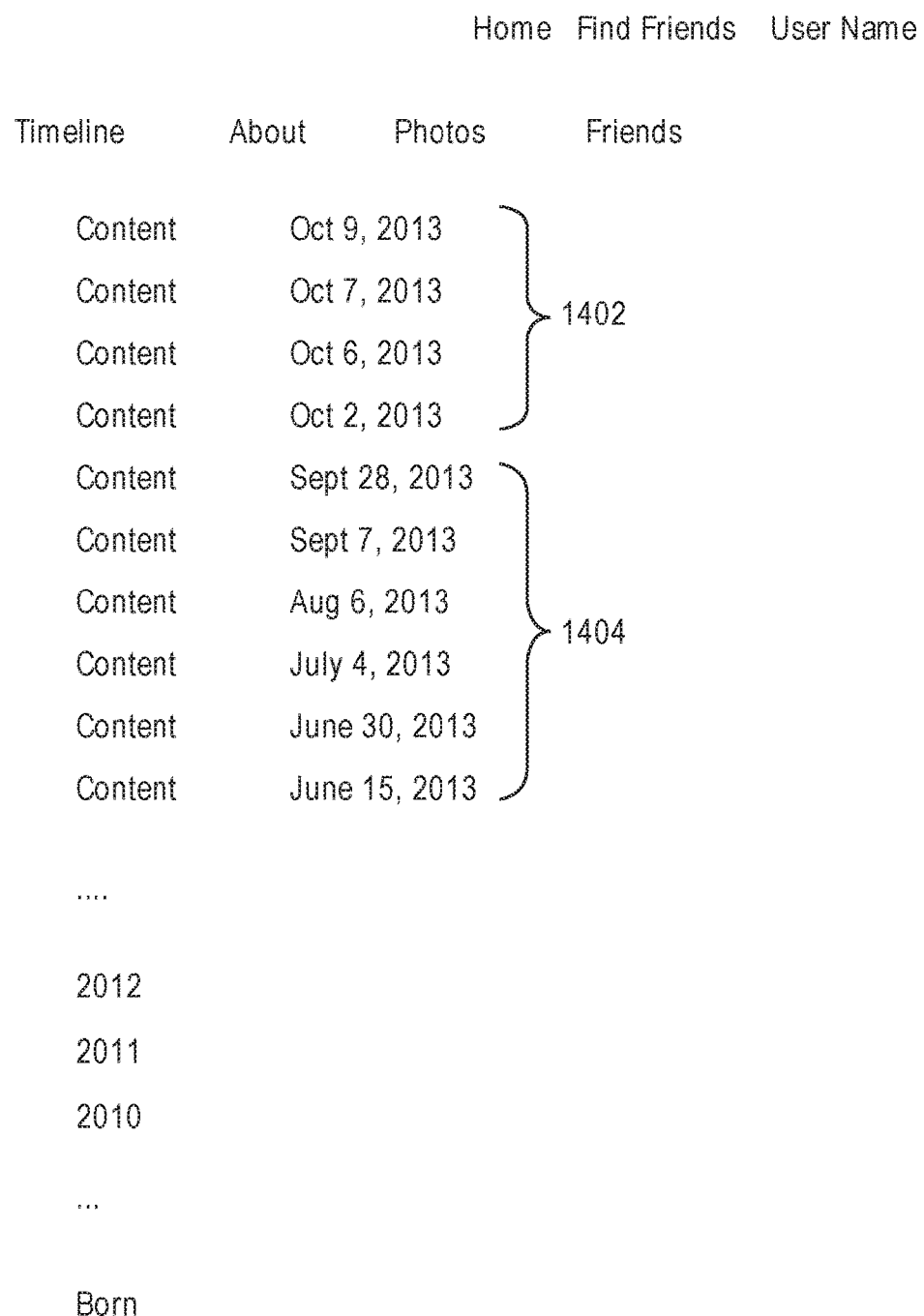
FIG. 14 illustrates online activity within an account the user has with an online social networking site and embodiments filtering certain online activity by date for use in determining a challenge question and response option.

For this purpose, referring to FIG. 14, according to one embodiment, the pre-determined criteria is a date a content item 644 was posted to the consumer's account 643. For example, if the pre-determined criteria is 10 days or less from a current date, then the verification program 622 would identify content items 644 posted to the account 643 within the last 10 days 1402, or the most recent updates to the account 643, but disregard or filter older posts 1404 not satisfying the pre-determined criteria.

Figure 15:
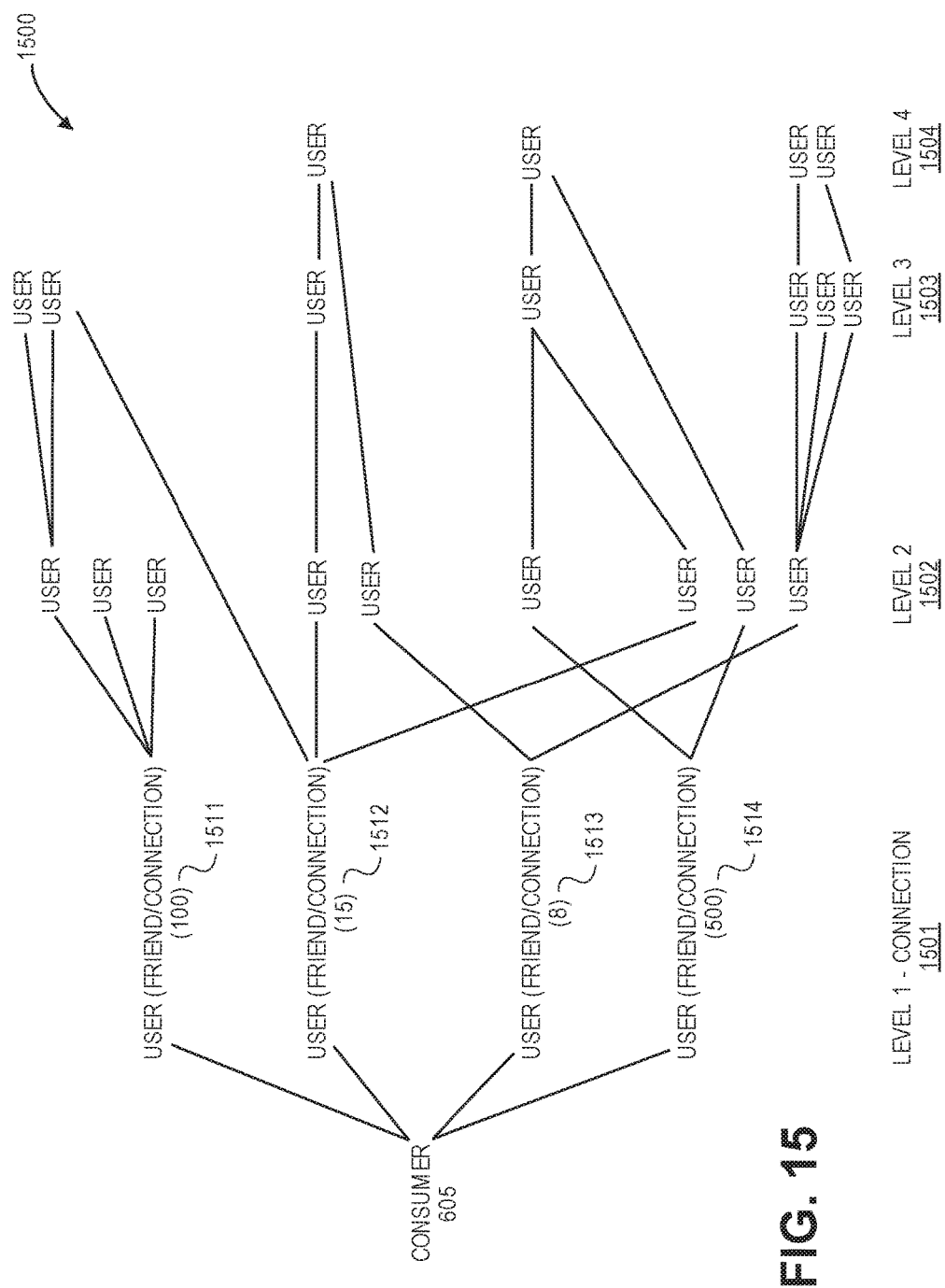
FIG. 15 generally illustrates a map of online social connections and how connections and degrees of non-connection or separation can be used to determine challenge question and response option.

Referring to FIG. 15, in another embodiment, the pre-determined criteria may involve a degree of connectedness or connections of the consumer's connections. For example, FIG. 15 generally illustrates a connection map or graph 1500 showing an example of how the consumer 605 is connected to other users 655, and how those other users 655 are connected to other users 655, and so on. FIG. 15 generally illustrates a direct connection, or Level 1 1501, and various non-connections or other users at Level 2 1502, Level 3 1503, Level 4 1504, and so on for more distant users or users that are increasingly disconnected or separated from the consumer 605 within the online social networking site 642. FIG. 15 also generally illustrates how each of the consumer's connections has different numbers of their own connections 1511-1514. For example, one friend or connection of the consumer 605 may have 100 online social connections, another friend or connection may have 15 online social connections, yet another friend or connection may have 8 online social connections, and another friend or connection may have 500 online social connections. The connection map 1500 generally illustrated in FIG. 15 not only illustrates direct and indirect connections spanning different levels or degrees of connection or separation, which may indicate probabilities, or how likely or unlikely, the consumer 605 will know another user 655.

With continuing reference to FIG. 15, according to one embodiment, the pre-determined criteria involves a level or degree of connection and how many connections that a connection of the consumer 605 has. For example, the pre-determined criteria may be a content item must be a direct or Level 1 1501 connection, and that the direct or Level 1 1501 connection selected has the least number of online social connections or a number of online social network connections that is less than a pre-determined number (e.g., 10) online social connections. In the example illustrated in FIG. 15, this would result in identification of only the second friend (consumer's connection with 8 total online social connections). It will be appreciated that other pre-determined criteria may be applied, and that FIG. 15 is only provided as an illustrative example of how embodiments may be implemented.

Referring again to FIG. 13, the verification program 622, at 1306, selects the identified content item 644 or a content item of a plurality of identified or selected content items 644, that satisfies the pre-determined criteria to serve as a valid response 627*v* ("v" referring to "valid" or correct response).

As one example, and continuing with the above example shown in FIG. 15, selection of the second friend (direct connection with the least online social connections) results in selection of a valid response 627*v* that also reduces the likelihood that that a fraudulent user or thief will be able to recognize the identified content item 644 of the second friend as an online social connection of the consumer 605 given the second friend's limited involvement in the online social network site 642 since this friend has only 8 connections compared to others that have 100 or 500 connections.

As another example, the verification program 622 may select a photograph or other content that was recently posted to the consumer's account 643 within a certain time.

At 1308, the verification program 622 determines data of or associated with the content item 644 selected as the valid response 627*v*. The data of or associated with the valid response 627*v* may indicate, the type of content item 644 (e.g., photograph, friend or connection, online post or remark, online like, song or video, electronic checkin), location, date, name, event, message or post by the consumer, etc. This data is used, at 1310, to derive or determine the challenge question 626 to be asked of the consumer 605 during the transaction.

For example, in the example in which a photograph was selected to be the valid response 627*v*, if the photograph has been tagged, has a title or described as being of El Capitan at Yosemite National Park, the verification program 622 may use this data to derive a challenge question 626 of "Where did you recently visit" or "Which photograph did you take?" As another example, if the photograph was described or tagged with data of a birthday for one of the online social connections of the consumer, the challenge question 626 derived may be "Whose Birthday was it?" As another example involving a different type of content item 644, if the identified content item selected as the valid response 627*v* is a name of a song or video, the verification program 622 may use this to derive a challenge question 626 of "What is your favorite song?" or "What song or album did you recently purchase?" As yet another example, if the identified content item selected as the valid response 627*v* is a name of a new online social connection, the verification program 622 may derive a challenge question 626 of "Who is a new social connection?" As a further example involving content items of electronic check-ins, the challenge question 626 may be "Where did you check-in in the last three days?" For these purposes, the verification program 622 may perform natural language analysis to determine a question or matching of terms of the data associated with the valid response 627*v* to select a question from a table of pre-determined questions.

In other embodiments in which the verification program 622 accesses data of online activity other that of an online social networking site 642 (e.g., by analyzing the consumer's e-mails), the challenge question 626 may be "Who do you often email?" It will be understood that the content item 644 selected as the valid response 627*v* may be content items of various types depending on the online account 643 utilized, and that the derived challenge question 626 may be based at least in part upon one or more of a description or remark provided by the consumer 605, a date, a title, a tag or other metadata of the content item 644.

At 1312, having determined the valid response 627*v* and the corresponding challenge question 626, the verification program 622 determines or selects invalid responses 627*i* ("i" indicating invalid, or incorrect), in embodiments in which invalid responses are to be presented as response options.

According to one embodiment, the verification program 622 determines a challenge question 626 and a content item as the valid response 627v to the challenge question 626, but no invalid response 627i options (e.g., for when the consumer 605 is to manually key in or type an answer rather than select an option). According to another embodiment, the verification program 622 determines a challenge question 626 and a content item as the valid response 627v and determines or generates one invalid response 627i such that the consumer 605 will be asked to choose among at least two response options 627 to answer the challenge question 626. According to another embodiment, the verification program 622 determines a challenge question 626 and a content item 644 as the valid response 627v and determines or generates two or more invalid responses 627i. For example, the verification program 622 may determine three invalid responses 627i such that the consumer 605 will be asked to choose among four response options 627 to answer the challenge question 626.

While embodiments are described with reference to a single challenge question 626 for ease of explanation, embodiments may involve determining multiple challenge questions 626 and respective response options 627 for a particular transaction. For ease of explanation, reference is made to a challenge question 626 and response options 627 having a valid response 627v and one or more invalid responses 627i, but it will be understood that embodiments are not so limited.

The verification program 622 may determine invalid responses 627i in different ways. According to one embodiment, the verification program 622 may select content items of accounts of other users 655 of the online social network site 642, for example, content from other users 655 that are not connections of the consumer 605. Thus, if a content item in the form of a photograph of the consumer's account 643 is selected as a valid response 627v, content items in the form of photographs pulled from accounts of other non-connection users 655 may be selected as invalid response options 627i. For this purpose, the verification program 622 may request photographs from the online social network computer 640, and the online social network computer 640 may access accounts of the other users 655 and provide photographs of non-connection users to the verification program 622 (e.g., without providing any other personal information about these other users 655 for purposes of privacy). Other search engines, such as Graph Search of facebook.com, may be utilized for this purpose, and may be used to determine response options from various connection levels.

According to another embodiment, the other user 655 whose account is used for an invalid response option 627i is not a connection of the consumer 605 but is a connection of a consumer's connection. For example, referring again to FIG. 15, content may be selected from an account of another user 655 in Level 4 1504. According to a further embodiment, an account of another user 655 qualifies to be used as a source of an invalid response 627i if that other user 655 is separated from the consumer 605 within the online social network site 642 by a pre-determined minimum number of degrees of separation, e.g., at least three degrees or levels of separation.

In a further embodiment, invalid response options 627i are determined by an internet search performed by the verification program 622 independently of the online social networking site 642. For example, if the challenge question 626 is "Who is one of your online social connections?" the verification program 622 may select one of the consumer's FACEBOOK friends and perform an internet search for random names or utilize an online random name generator to determine invalid response options 627i. While embodiments involving an internet search to determine invalid response options 627i for names, it will be understood that embodiments are not so limited, and that randomly generated or selected response options may be identified by other search engines including, for example, Graph Search of facebook.com.

Embodiments that select a content item 644 as a valid response 627v based on pre-determined criteria, and select as an invalid response option 672i a content item from an account of another user 655 that is separated from the consumer 605 by certain degree increase the probability that the consumer 605 will readily recognize the valid response 627v but not the invalid responses 627i such that the consumer 605 will be able to quickly identify the valid response 627v as their own social content whereas a fraudulent user or thief would be left to essentially guessing which option item is the valid one.

Referring again to FIG. 12, having determined the challenge question 626 and response options 627 including a valid response 627v and invalid responses 627i, at 1214, the intermediate computer 620 also receives a response 676 from the computer 630 of the credit card issuer 635 via the card network, before or after various steps discussed above, indicating whether the issuer 635 authorized the transaction, in which case the authorization code 632 is transmitted to the intermediate computer 620 if valid credit is available. Thus, in this embodiment, the intermediate computer 620 handles the challenge question 626/response 627 determinations and the communications with the issuer computer 630, but embodiments are not so limited.

Figure 16:
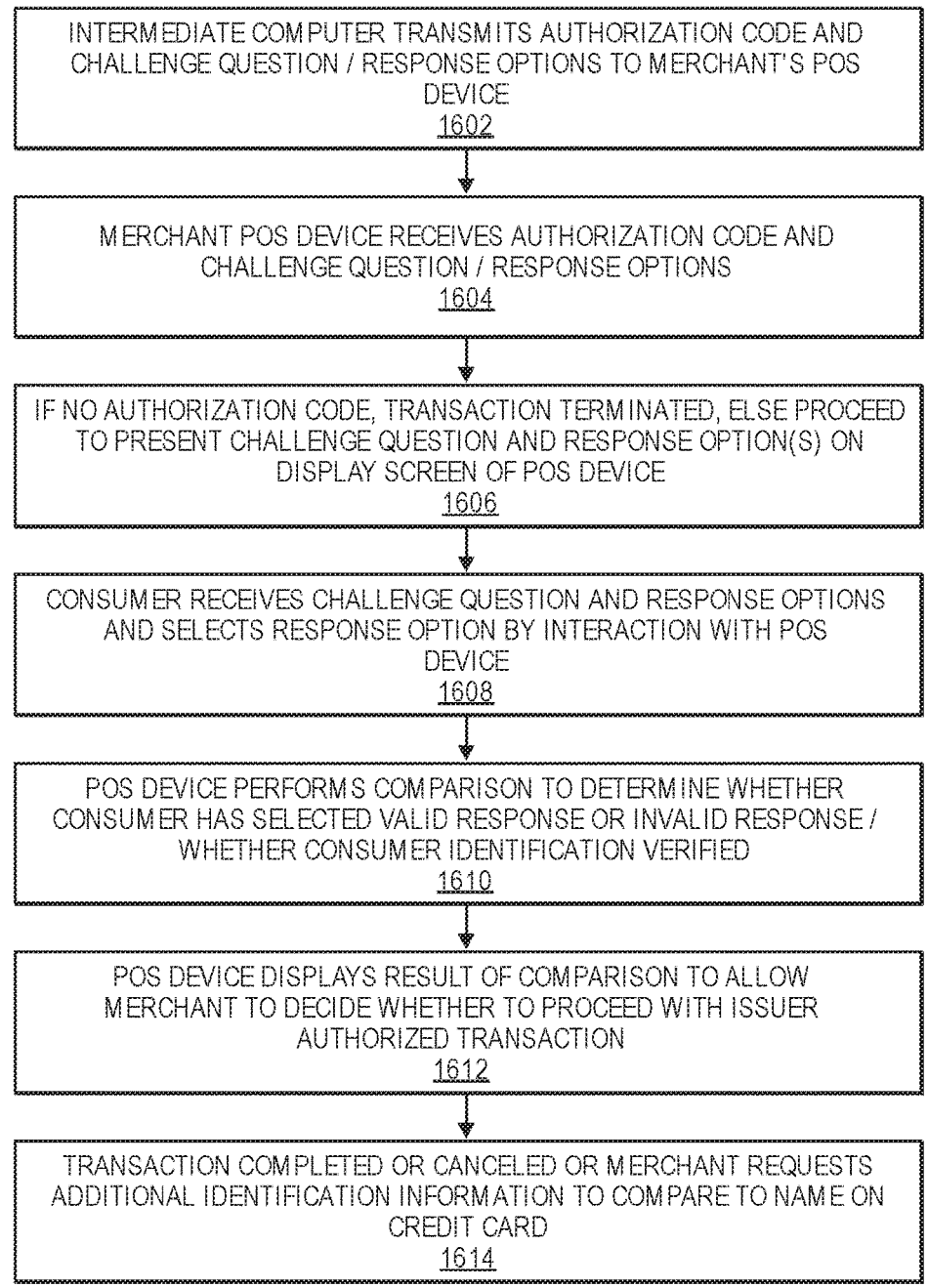
FIG. 16 is a flow diagram illustrating steps performed according to one embodiment after a challenge question and response option are determined, before a transaction has been completed.
Figure 17:
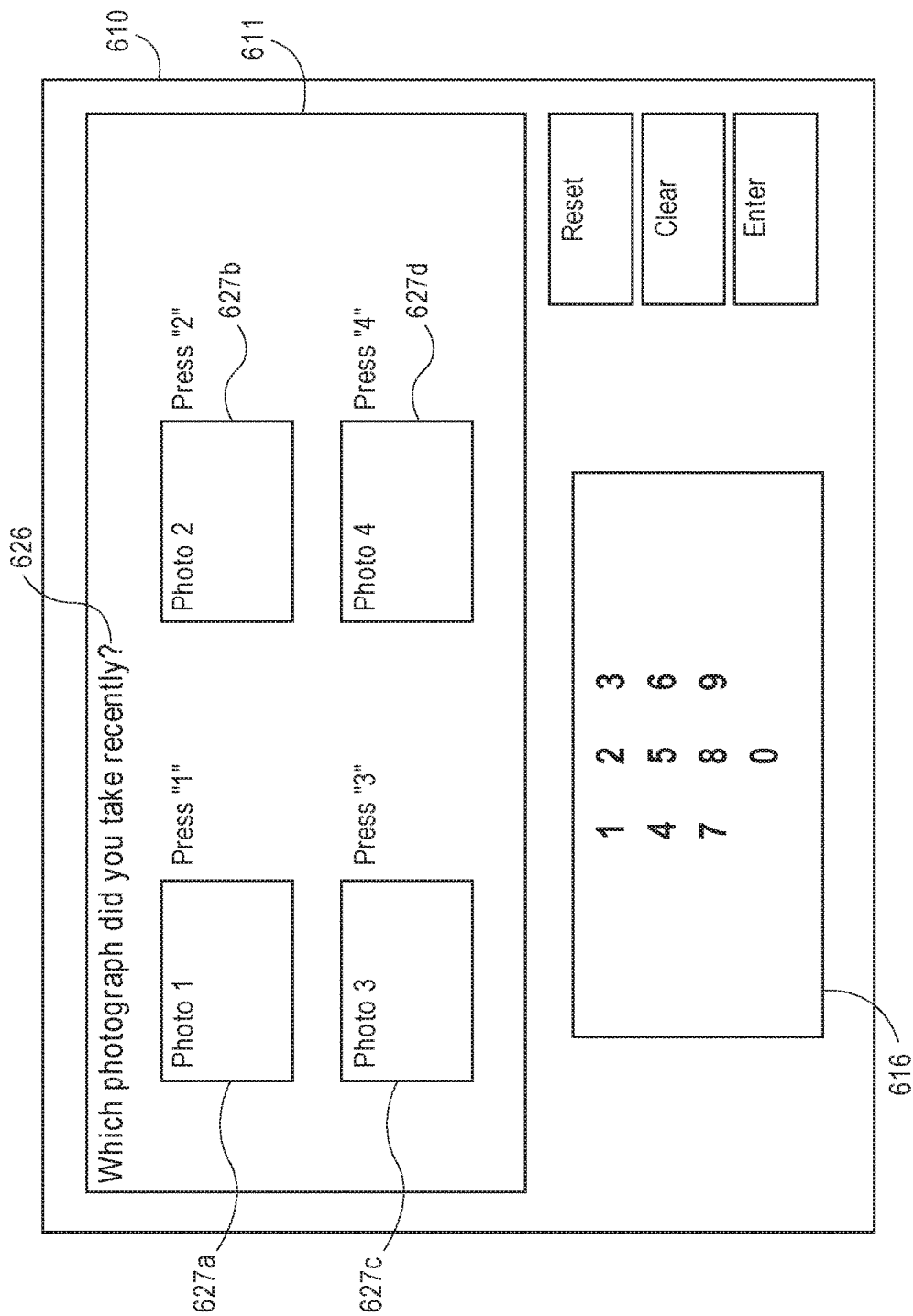
FIG. 17 illustrates how a challenge question and response options in the form of photographs, at least one of which was taken or posted by the consumer, are presented to the consumer through a display of the merchant's point of sale device according to one embodiment.
Figure 18:
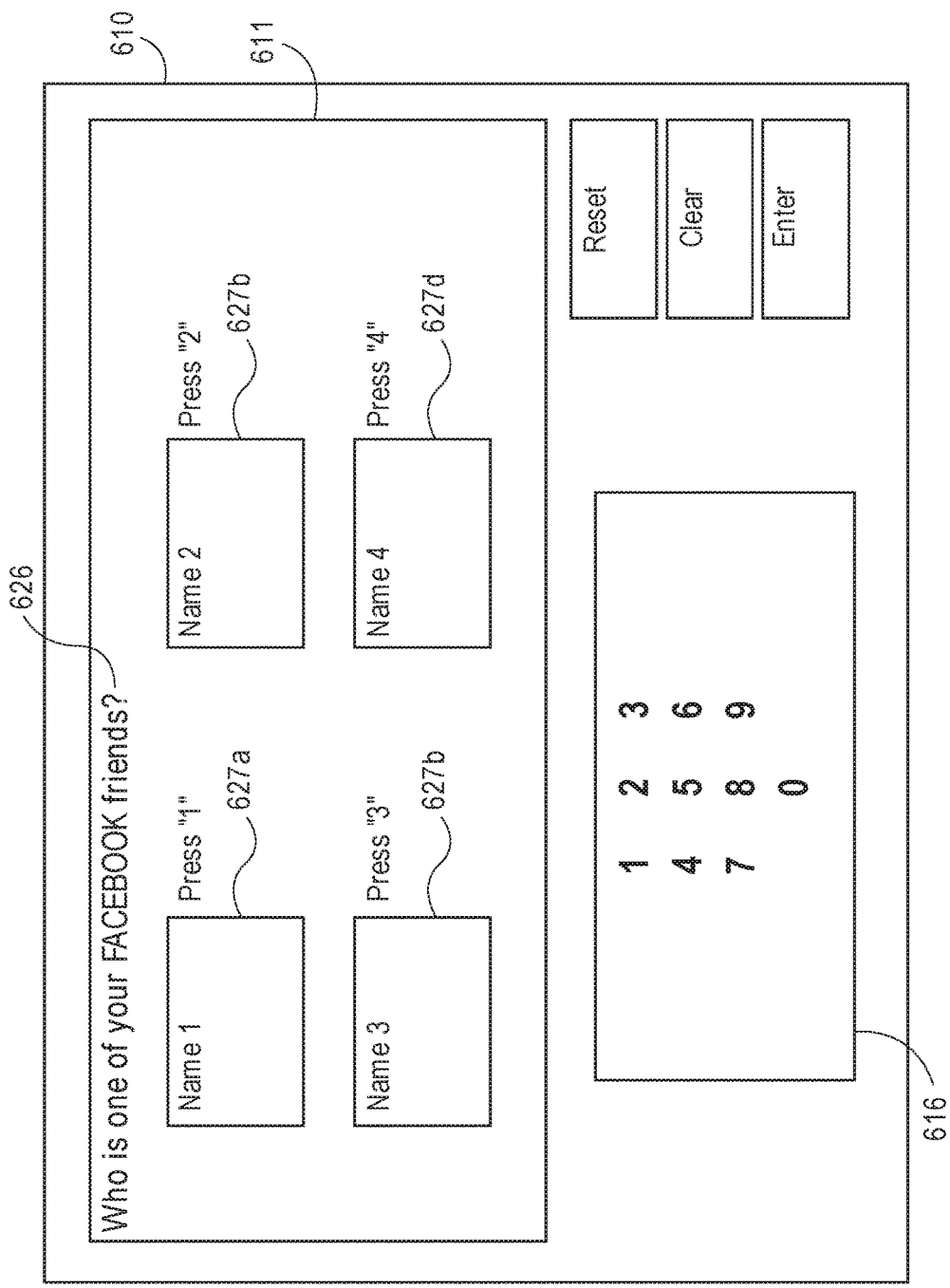
FIG. 18 illustrates how a challenge question and response options in the form of names, at least one of which is an online social connection of the consumer, are presented to the consumer through a display of the merchant's point of sale device according to one embodiment.
Figure 19:
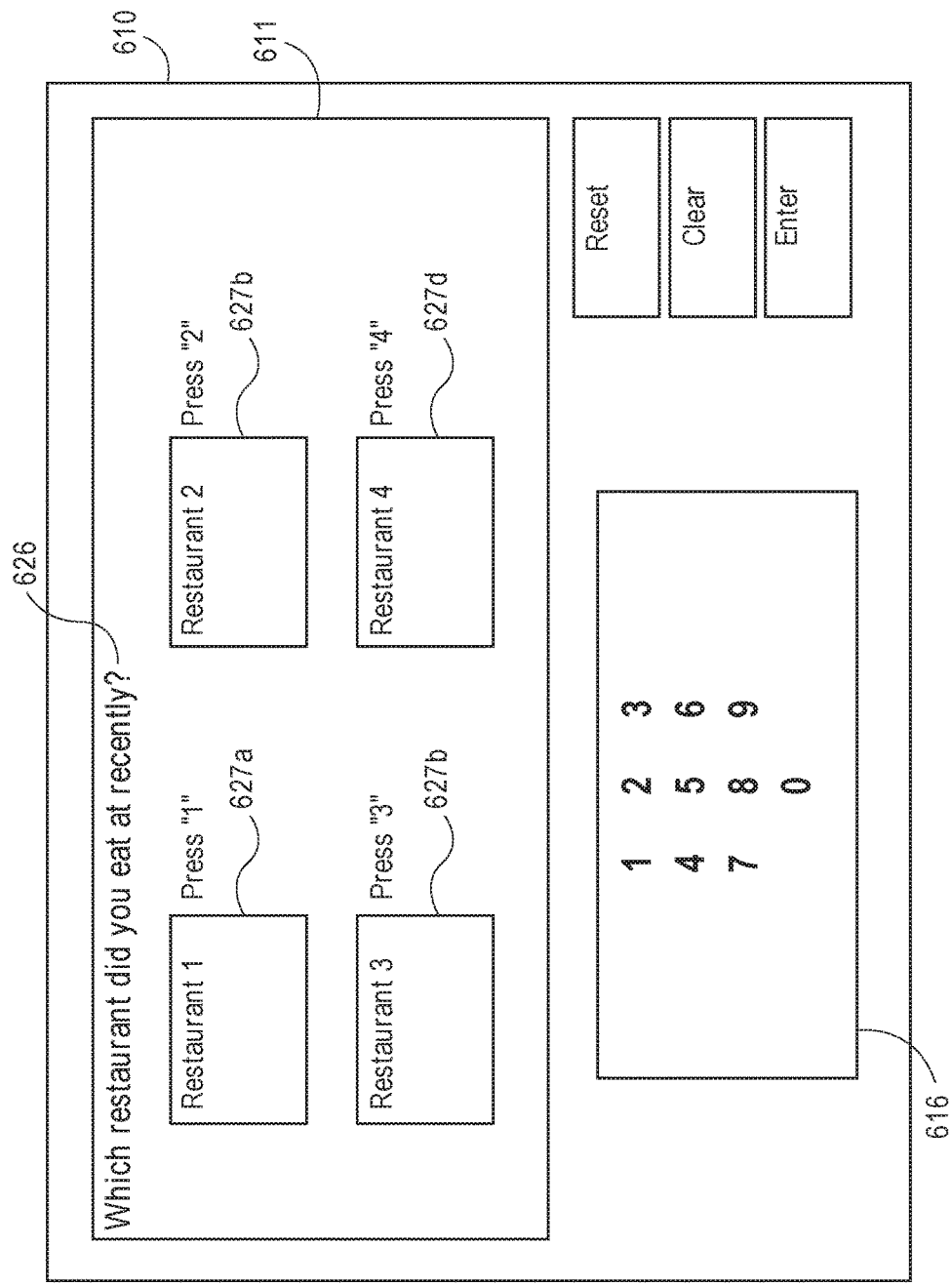
FIG. 19 illustrates how a challenge question and response options in the form of restaurants, at least one of which is a restaurant at which the consumer visited, are presented to the consumer through a display of the merchant's point of sale device according to one embodiment.
Figure 20:
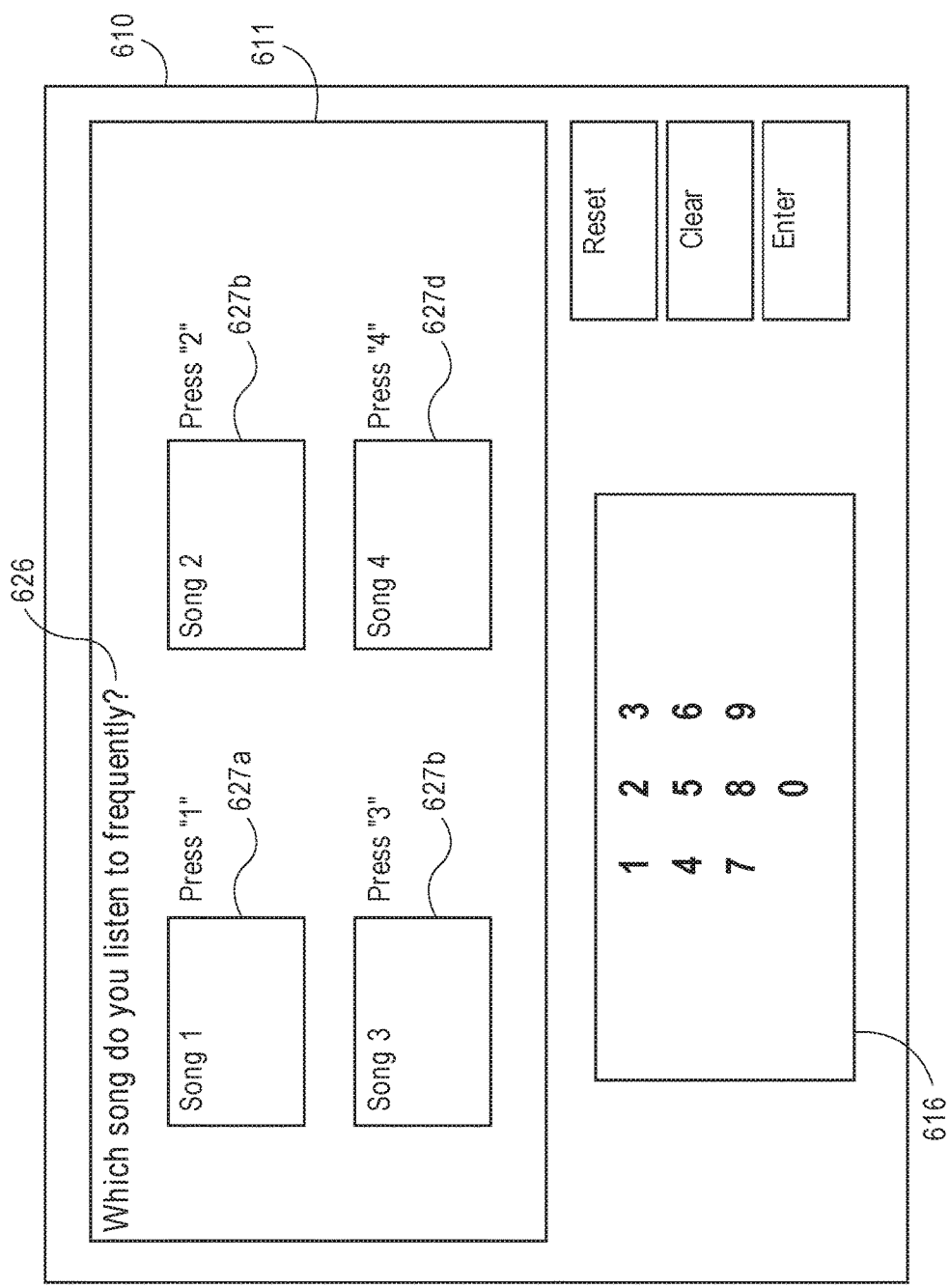
FIG. 20 illustrates how a challenge question and response options in the form of names of songs, at least one of which is a song that was purchased or listed by, or is listened to by the consumer frequently, are presented to the consumer through a display of the merchant's point of sale device according to one embodiment.

Referring again to FIG. 6, and with further reference to FIG. 16, having received the issuer authorization code 632 and determined the challenge question 626 and response options 627 based at least in part upon the online activity of the consumer 605 within the online social network site 642, at 1602, the intermediate computer 620 transmits 677 the issuer's response or authorization code 632 and the determined challenge question 626/response options 627 to merchant's POS device 610, and at 1604, the merchant POS device 610 receives the issuer's response or authorization code 623 and the challenge question 626/response options 627. At 1606, if the issuer 635 did not provide an authorization code 632, the transaction terminated, else the transaction proceeds and the merchant POS device 610 displays 678 the challenge question 626 and response option(s) 627 to the consumer 605 via the display 611 of POS device 610 as shown in FIG. 6. At 1608, the consumer 605 views challenge question 626 and response options 627 and selects 679 a response option 627 by interaction with POS device 610, e.g., using a keypad 616 or touchscreen of the POS device 610.

For example, referring to FIGS. 17-20, the challenge question 626 is displayed by the merchant's POS device 610 together with four response options (1-4) 627a-d and illustrate examples involving the challenge question 626 asking the consumer 605 to identify which photograph the consumer 605 captured or posted, which person is an online social network connection or friend, at which restaurant the consumer 605 recently dined or electronically checked in, and which song does the consumer 605 listen to frequently. While FIGS. 17-20 illustrate response options that can be selected, other embodiments may involve the consumer 605 typing an answer using a keypad 616 of the POS device 610 or different numbers of response options. Accordingly, it will be understood that embodiments may involve other content items such that a photograph, online social connection, and location such as a restaurant, and a song are examples of content items that may be utilized.

Figure 21:
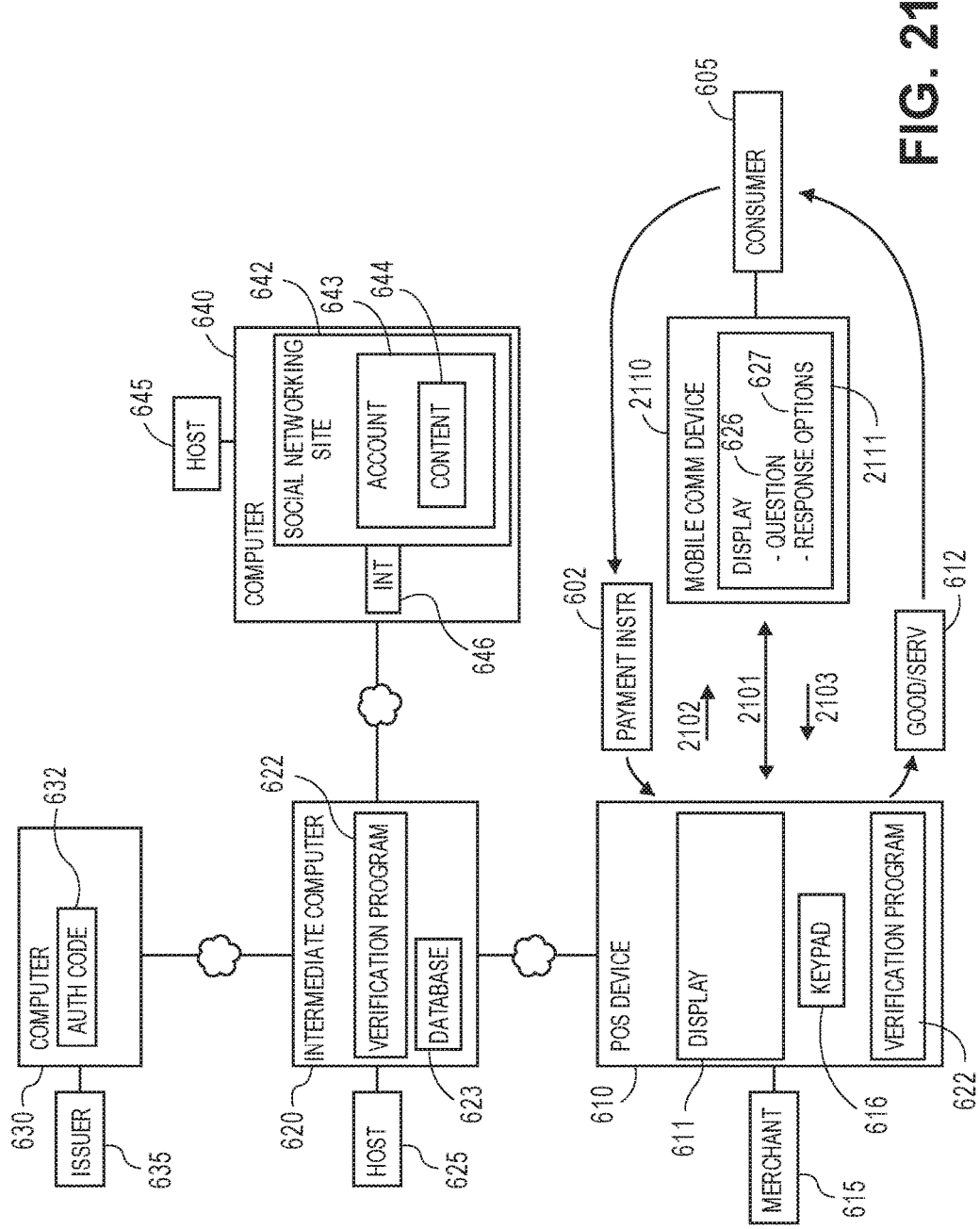
FIG. 21 illustrates components of a system constructed according to one embodiment in which, before a transaction has been completed, a merchant requests data for verifying a consumer's identity, an intermediate computer determines a challenge question and response options, challenge question and response options are communicated from the merchant point of sale device to a mobile communication device of the consumer, and presented to and answered by the consumer through the mobile communication device, the answer being communicated to the merchant point of sale device.

In another embodiment, referring to FIG. 21 (in which other users 655 and computers 650 thereof are omitted for ease of illustration), after the POS device 610 receives the challenge question 626 and response options 627, the POS device 610 transmits 2102 the challenge question 626 and response options 627 to a mobile communication device 2110 of the consumer 605, e.g., via a NFC or other wireless connection 2101 established between the POS device 610 and the mobile communication device 2110. Thus, in this embodiment, rather than the consumer 605 viewing the challenge question 626 and response options 627 on the POS device display 611, they are presented to the consumer 605 through a display 2111 of the mobile communication device 2110, and the consumer 605 selects a response option 627 by a touchscreen or keypad of the mobile communication device 2110. The selected option 627 is then transmitted 2103 to the POS device 610 via the NFC or other wireless connection.

Referring again to FIG. 16, at 1610, the verification program 622 executing on the POS device 610 performs a comparison 680 of the selected response option 627 and the valid response 627v previously received from the intermediate computer 620 and at 1612, presents a result to the merchant 615 that indicates that the consumer 605 has correctly answered the challenge question(s) 626 such that it is verified that the consumer 605 is the person named 702 on the tendered credit card 700, or to inform the merchant 615 of the result(s) so that the merchant 615 can decide whether to proceed with the transaction. For a particular transaction, the consumer 605 may be presented with one challenge question 626 or multiple challenge questions 626, which increases the probability that the person named 702 on the tendered credit card 700 is the consumer 605 as the consumer 605 additional challenge questions 626 correctly. At 1614, the merchant 625 proceeds with processing the transaction assuming the issuer authorization code 632 was received, or terminating the transaction if the merchant 605 is not satisfied with the results, or requesting that the consumer 605 provide additional identification information establishing that the consumer 605 is the person named 702 on the credit card 700 such as a driver's license, passport or other form of identification.

In a further embodiment, intermediate computer 620 sends only the challenge question 626 to the POS device 610, but does not send the response options 627 to the POS device 610. The POS device 610 still presents the challenge question 610 to the consumer 605, and the consumer 605 selects a response option 627 by interacting with the POS device 610. In these embodiments, the POS device 610 serves to present the challenge question 626 and collect the consumer's response without knowing the correct or valid response 627v. The merchant POS device 610 then transmits the consumer's answer to the intermediate computer 620 which analyzes the answer to determine whether the consumer 605 selected the valid response 627v. The verification program 622 then generates a result and transmits a message back to the POS device 610 advising the merchant 615 of the result so that the merchant 615 can assess the result. Thus, with these embodiments, since the merchant's POS device 610 does not know whether a response option is valid or invalid, it may be more difficult for thieves or hackers to try to attack the POS device 610 to determine which response option is the valid response 627v.

Figure 22:
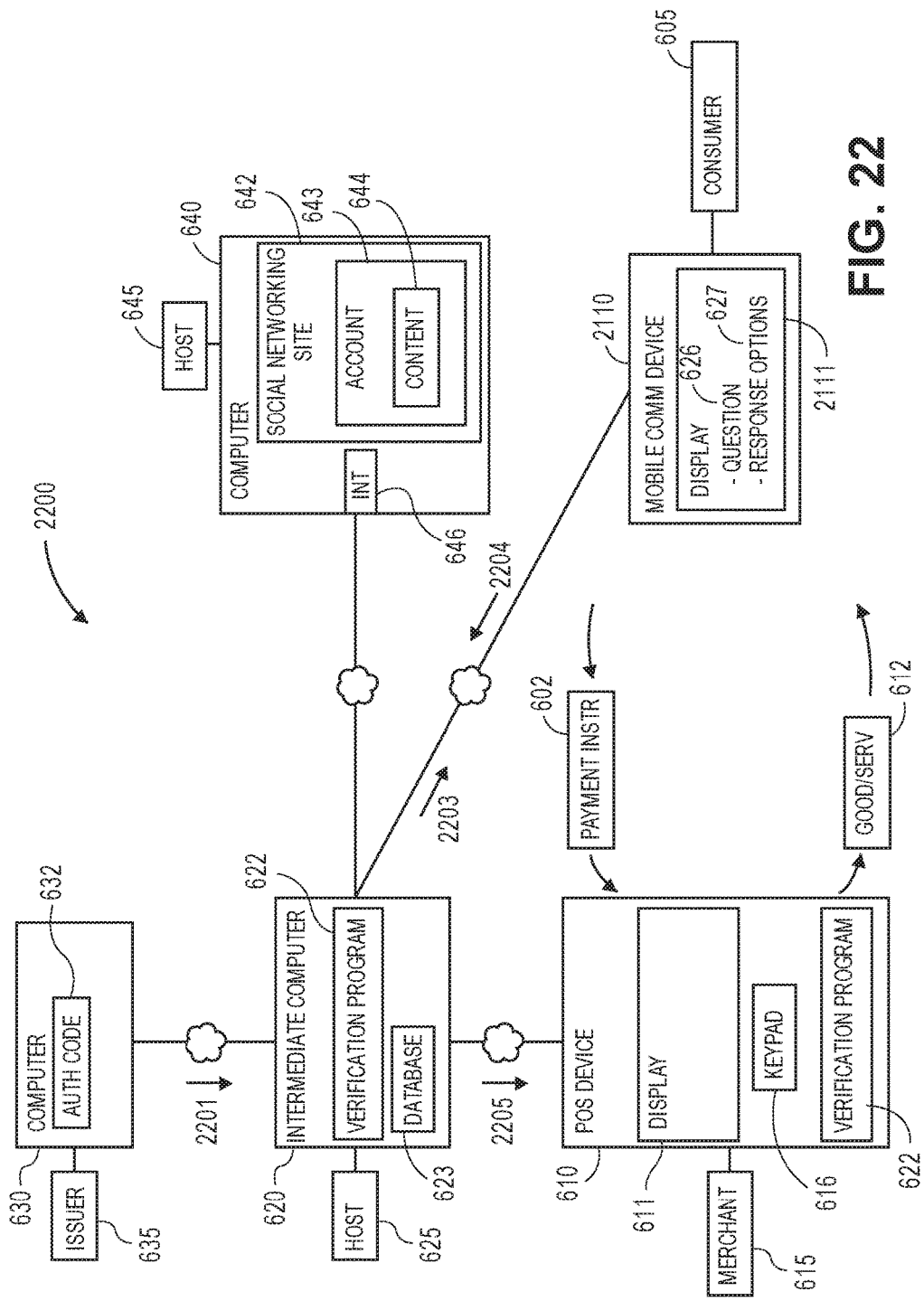
FIG. 22 illustrates components of a system constructed according to one embodiment in which, before a transaction has been completed, a merchant requests data for verifying a consumer's identity, an intermediate computer determines a challenge question and response options and communicates with a consumer's mobile communication device to present the challenge question and response options to the consumer, receive the consumer's answer, and generate result that is transmitted to the merchant in response to the request.

Referring to FIGS. 22 (in which other users 655 and computers 650 thereof are omitted for ease of illustration), in a system 2200 according to another embodiment, the intermediate computer 620 and the consumer's mobile communication device 2110 are in communication with each other via a network such as a cellular network capable of electronic mail or SMS messages. The challenge question 626 and response options 627 are transmitted by the intermediate computer 620 to the consumer's mobile communication device 2110 and presented to the consumer 605 through the display 2111 of the mobile communication device 2110. The consumer 605 selects a response option 627 using the mobile communication device 2110, and the intermediate computer 620 can compare the valid response 627v and the consumer's answer to the challenge question 626.

In these embodiments, the consumer 605 may tender a physical credit card 700 or other payment instrument, or use the mobile communication device 2110 as a mobile wallet. In both of these embodiments, the merchant POS device 610 receives data of the tendered credit card 700 and transmits the received data to the intermediate computer 620 as discussed above, and which communicates with the issuer computer 630 and determines a challenge question 626 and response options 627 as described in detail above.

Figure 23:
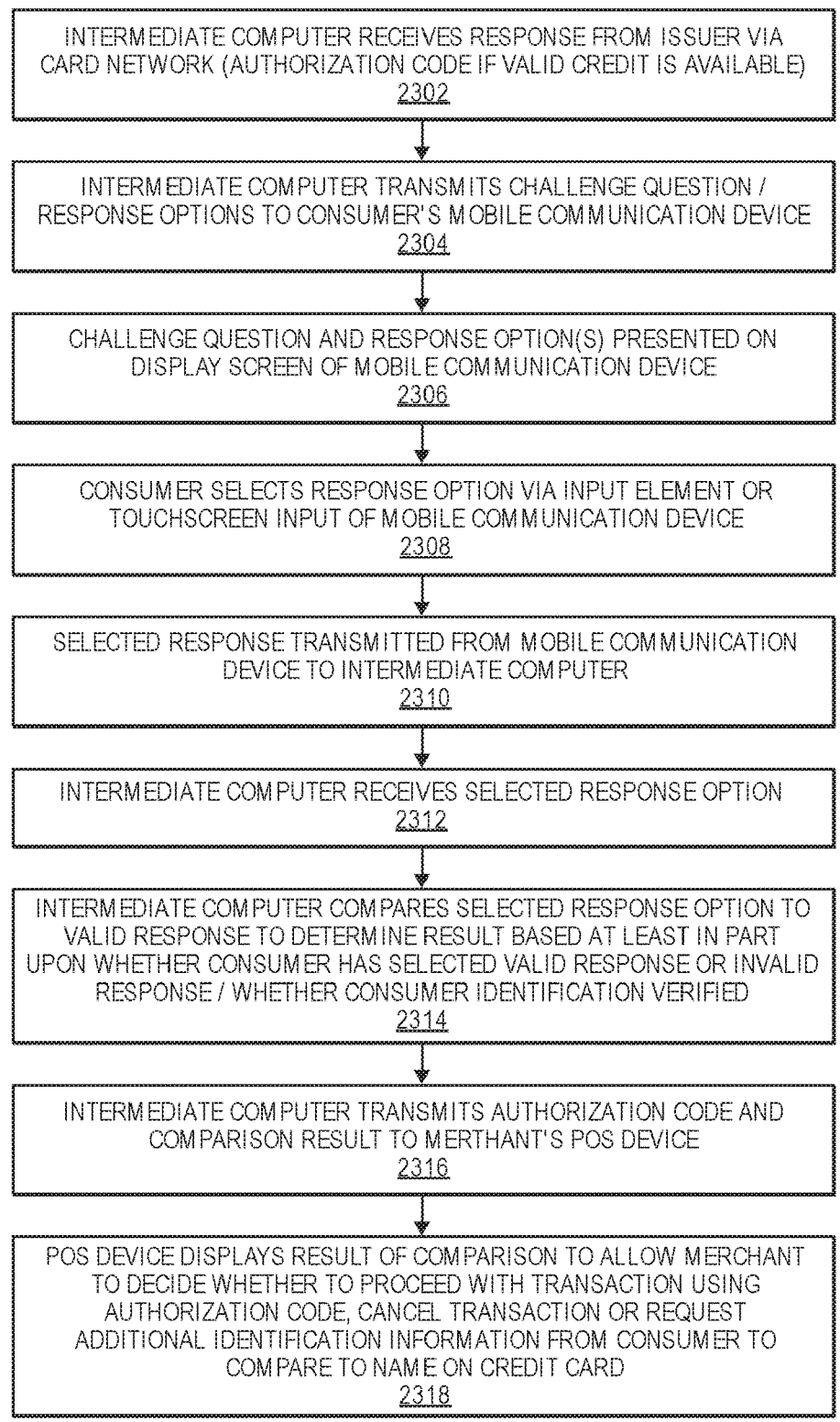
FIG. 23 is a flow diagram illustrating communications between the intermediate computer and the consumer's mobile communication device and between the intermediate computer and the merchant point of sale device FIG. 22 in the system shown in FIG. 22.

More specifically, referring to FIG. 23 (which omits previous steps involving communications between the intermediate computer 620 and the POS device 610, and between the intermediate computer 620 and issuer computer 630 as described above for ease of explanation), and with continuing reference to FIG. 22, the intermediate computer 620 receives 2201 the authorization code 623 from the issuer computer 630 when valid credit is available, and at 2304, the intermediate computer 620 looks up 2202 contact information for the consumer's mobile communication device in the database 623 (e.g., the cellular phone number or an e-mail address as shown in FIG. 9), transmits 2203 the challenge question 626 and response options 627 to consumer's mobile communication device 2110, e.g., in an e-mail or SMS message. At 2306, the mobile communication device 210 receives the message from the intermediate computer 620, which is triggered to launch, or the consumer launches in response, an application or program executing on the mobile communication device 2110 for displaying the message and the challenge question 626 and response options 627 therein on the display 2111 of the mobile communication device 2110. At 2308, the consumer 605 selects a response option 627 via the display 2111 operable as touchscreen or other input element of the mobile communication device 2110, and at 2310, the selected response 627 is transmitted 2204 from the mobile communication device 2110 to the intermediate computer 620. At 2212, the verification program 622 receives the selected response option and at 2214, compares the consumer's selected response option and the valid response 627v to determine a result based at least in part upon the comparison or whether consumer 605 has selected valid response 627v to verify that the consumer 605 is the person named 702 on the credit card 627, or an invalid response 627i indicating that the merchant 615 should request additional information from the consumer 605, proceed at the merchant's own risk, or cancel the transaction. At 2316, the intermediate computer 620 transmits 2205 the authorization code 632 and the comparison result to the POS device 610. In one embodiment, the intermediate computer 620 waits to transmit the authorization code 632 or issuer 635 response until after the consumer 605 answers the challenge question 626, but the authorization code 632 can be transmitted to the POS device 610 when the intermediate computer 620 receives the authorization code 632, which may be before or after the intermediate computer 620 receives the consumer's answer to the challenge question 626.

At 2318, the POS device 610 displays a result of the analysis performed by the intermediate computer 620, and with this information, the merchant 615 can decide whether or how to proceed with the transaction using the authorization code 632, cancel the transaction or request additional identification information from the consumer 605 to verify that the consumer 605 is the person named on the credit card 700.

In another embodiment, using the system configuration shown in FIG. 22 in which the intermediate computer 620 and the mobile communication device 2110 are in communication with each other, the intermediate computer 620 transmits only the valid response 627v to the POS device, whereas the challenge question 626 and the response options 627 re transmitted to the consumer's mobile communication device 2110. The consumer 605 then answers the challenge question 626 through the mobile communication device 2110, and the consumer's response is transmitted to the POS device 610, e.g., via a NFC or other wireless connection between the POS device 610 and the mobile communication device 2110 (as shown in FIG. 21). The POS device 610 can then compare the valid response 627v and the response selected by the consumer 605 to determine whether the consumer's identity has been verified.

While certain embodiments are described with reference to determining a challenge question 626 and response options 627 based on data of an account 643 the consumer 605 has with one online social networking site 642, other embodiments involve utilizing data from different accounts 643 the consumer 605 has with different online social networking sites 642, or aggregating data from multiple consumer accounts 643 with different social networking sites 642. For example, response options 627 for a given challenge question 626 may include valid responses 627v based on content from one or multiple social networking site accounts 643 of the consumer 605, or when a transaction involves multiple challenge questions 626, one challenge question 626 and at least the valid response 627v can be based on one account 643 (e.g., an account with facebook.com), whereas another challenge question 626 and at least the valid response 627v for that other challenge question 626 can be based on another account 643 (e.g. an account with twitter.com). It will be understood that challenge questions 626 and/or valid response options 627v can be determined from one or multiple consumer accounts 643, using one or multiple online social networking sites 642, and when multiple challenge questions are presented for a particular transaction, one challenge question can be based on one consumer account 643 with an online social networking site, 642 whereas another challenge question 626 can be based on a different consumer account 643 with a different online social networking site 642.

In certain embodiments, social network based challenge questions 626 and response options 627 are usable for a pre-determined number of times or for a pre-determined amount of time. For example, in one embodiment, the challenge question 626 and valid response 627v combination are single use and valid for a single transaction. Thus, after the challenge question 626 and valid response 627v are used for a first transaction, the verification program 622 determines, e.g., in response to a subsequent request by a POS device for a different, second transaction, either a second challenge question 626 and a second valid response 627v, or a second valid response 627 to the same challenge question 626, and the new challenge question—valid response combination is usable for the second transaction.

In another embodiment, a challenge question 626 and response options 627 can be used multiple times for different transactions, but only for a pre-determined number of transactions, e.g., for five transactions, after which that challenge question 626 and valid response 627v expire such that when the verification program 622 receives a request by a POS device 610 of the same or other merchant for a sixth transaction, the intermediate computer 620 then analyzes data of the consumer's social network account 643, or another account the consumer 605 has with another online social networking site 642, to determine a new challenge question 626 and response options 627. In a further embodiment, a challenge question 626 and response options 627 can be used for a pre-determined time. For example, a challenge question 626 and valid response 627v may be valid for one day or one week, after which that challenge question 626 and that valid response 627v expire, and a new social network based challenge question 626 and valid response 627v must be determined by the intermediate computer 620 for transactions during the next time period.

Further, when embodiments utilize multiple online social networking sites 642, the verification program 622 may make determinations about which online social networking site 642 to select for purposes of determining at least a challenge question 626 and a valid response 627v and/or an invalid response 627i, and when to switch to another online social networking site 642 for these purposes. For example in one embodiment, the verification program 622 may switch between using different online social networking sites 642 after a pre-determined number of transactions or after a pre-determined time. As another example, verification program 622 determines which online social networking site 642 is identified more frequently by its registered users, and selects that online social networking site 642 to use more frequently than others, or to use initially.

Figure 24:
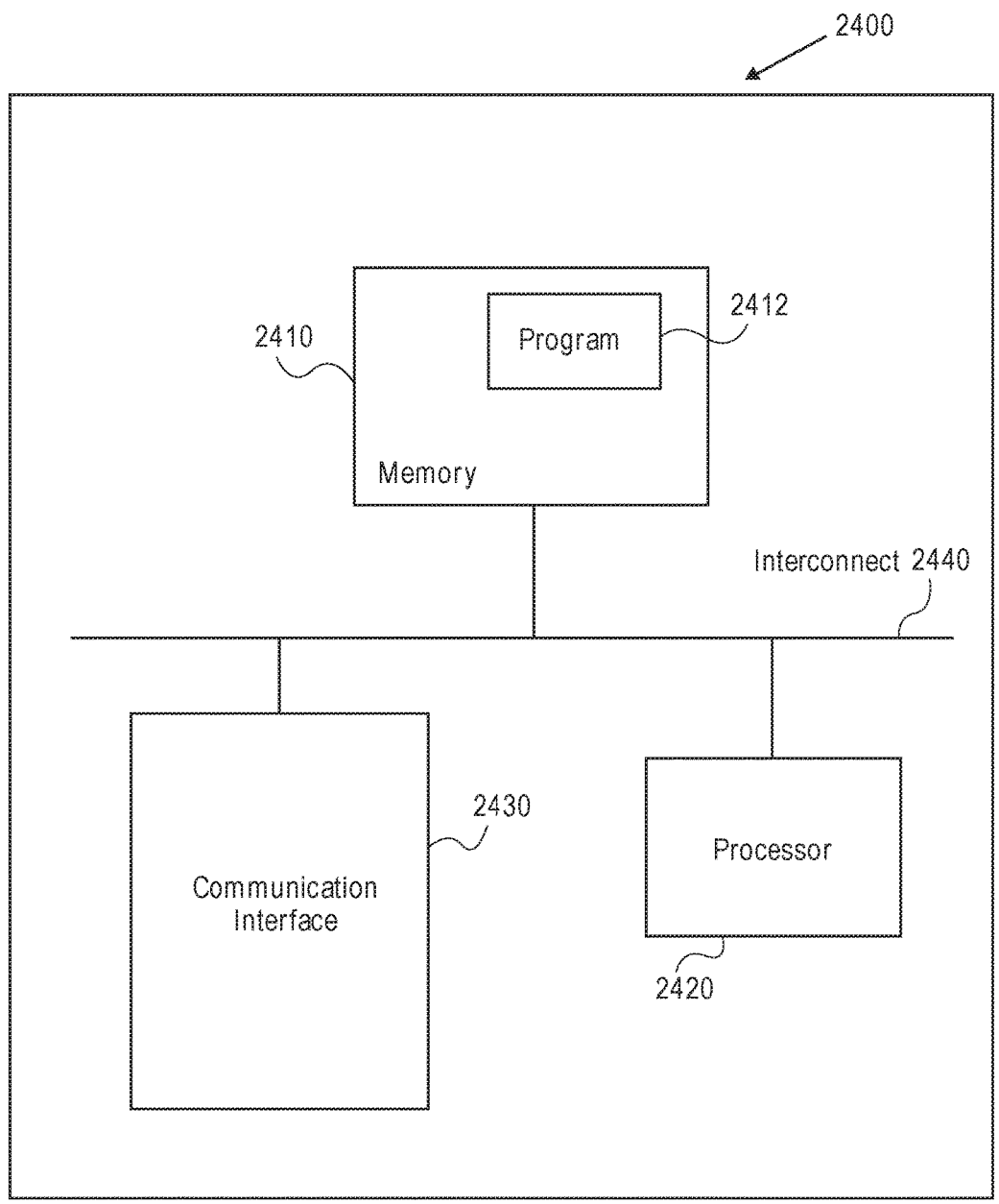
FIG. 24 is a system diagram of components of a computing apparatus that may be utilized by or embodied within various system components.

FIG. 24 generally illustrates components of a computing device 2400 that may be utilized to execute embodiments and that includes a memory 2415, account processing program instructions 2412, a processor or controller 2420 to execute account processing program instructions 2412, a network or communications interface 2430, e.g., for communications with a network or interconnect 2440 between such components. The memory 2410 may be or include one or more of cache, RAM, ROM, SRAM, DRAM, RDRAM, EEPROM and other types of volatile or non-volatile memory capable of storing data. The processor unit 2420 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2440 may include a system bus, LDT, PCI, ISA, or other types of buses, and the communications or network interface may, for example, be an Ethernet interface, a Frame Relay interface, or other interface. The network interface 2430 may be configured to enable a system component to communicate with other system components across a network which may be a wireless or various other networks. It should be noted that one or more components of computing device 2400 may be located remotely and accessed via a network. Accordingly, the system configuration provided in FIG. 24 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2420 executes program instructions 2412 within memory 2410 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference to credit cards, it will be understood that embodiments may be utilized for verifying that the consumer is the person named on other payment instruments such as debit cards and checks. With debit cards, for example, debit cards also have a printed name and account number, and this data can be used by the consumer to register with the intermediate computer. Checks contain static, printed information including an account holder name, address and MICR information such as account number and routing number. This printed, static information can be used by the consumer to register with the intermediate computer, and can be determined by a device that scans or reads checks, manually entered by the merchant into the POS device, or determined by use of an imaging device and Optical Character Recognition. Thus, when the name on the check is determined, this name data can be used in a similar manner as described above with reference to the name or other static data appearing on a credit card. Thus, embodiments can serve as a fraud prevention or reduction tool not only with payment cards but also with negotiable instruments.

Moreover, while embodiments have been described with reference to a person-to-person transaction during which the consumer tenders a physical payment instrument such as a credit card, debit card or check, or a physical device such as a mobile communication device serving as a mobile wallet, embodiments are also applicable to on-line transactions conducted between consumer and merchant computing devices through the internet during which the consumer and the merchant are not face to face. In these embodiments, rather than presenting a challenge question and response options through a merchant POS device, the social network based challenge question and response options can be communicated to the consumer through the computing device utilized to initiate the on-line transaction or through a mobile communication device. Thus, in the on-line context, a transaction may be initiated when an item has been added to an electronic shopping cart, or after the item has been added to an electronic shopping cart and the consumer presses a "purchase" button after entering credit card information, but before the transaction is confirmed such as before a receipt or other e-mail confirmation is generated. Embodiments are executed to verify that the person who made the online purchase is the person named on the credit card that was utilized for that online purchase.

Additionally, while embodiments are described with reference to online social networking sites such as facebook.com, twitter.com, myspace.com, linkedin.com, embodiments may also be implemented using other sources of online activity by the consumer such as based on electronic mail messages received by and sent by the consumer, e.g., using MICROSOFT OUTLOOK e-mail program (e.g., a personal e-mail account or a company or employee email account) or an account with web-based e-mail service offered through, for example, gmail.com, aol.com, apple.com, yahoo.com. In these e-mail embodiments, rather than analyzing attributes such as names of online social network connections, degrees of connection or separation between the consumer and non-connections, how often a song or video is played, or when the user posted a photograph to a wall or profile, embodiments analyze content items in the form of electronic mail messages to identify attributes including recipient, sender and subject matter. For this purpose, when registering with the intermediate computer, the consumer may provide login information to allow the verification program to access or read the consumer's e-mails. The verification program analyzes e-mails to identify, for example, frequent recipients of e-mails sent by the consumer, frequency senders of e-mails to the consumer, and subject matter of e-mails (e.g., reflecting a recent purchase), e-mail communications involving one to one correspondence rather than emails involving a group. For example, if the consumer has frequent one to one communications with John Smith, the verification program may identify this name as the valid response to a challenge question of "Who sends you frequent e-mails?" and invalid responses may be, for example names of users of an online social networking site that are separated from the consumer by a pre-determined minimum degree, or using an internet search or random name generator to generate random names as invalid responses. As another example, an e-mail may include a receipt for a recent purchase such that the verification program can scan the e-mail to determine the item that was purchased (e.g., a new camera) as a valid response. Accordingly, it will be understood that the same or similar analysis described above with reference to data of an account the consumer has with an online social networking site may also be applied to electronic mail messages received or transmitted by the consumer, and that embodiments may involve analysis of only online social network data, only electronic mail data, or both.

Embodiments may also involve e-commerce sites such AMAZON and EBAY online purchase and auction services (amazon.com, ebay.com) or other commerce or online services sites involving different types of media (e.g. songs, movies), one example of which is netflix.com, which is used for renting movies.

In these embodiments, online activity is in the form of items purchased online or items sold online. In embodiments involving e-commerce sites, the verification program accesses the user's amazon.com, ebay.com or other and analyzes purchase or sales data to identify, for example, frequent or recent item purchases, frequent or recent item sales, frequent or recent buyers, and frequent or recent sellers. Thus, for example, if the consumer frequently purchases a particular coffee from amazon.com every month, the verification program may identify this item as the valid response to a challenge question of "What do you often buy on amazon.com?" and invalid responses may be, random items selected from amazon.com or determined by a random word generator or internet search. Accordingly, it will be understood that the same or similar analysis described above with reference to data of an account the consumer has with an online social networking site may also be applied to electronic commerce accounts of the consumer, and that embodiments may involve analysis of e-commerce accounts only or in combination with other types of online consumer accounts.

Embodiments may also analyze other types of online activity such as prior transactions reflected in transaction histories of a checking account of the consumer such that a challenge question and valid response may involve from which merchant the consumer previously made a purchase, or particulars about a transaction such as a large deposit or large check that was recently written by the consumer.

Moreover, while embodiments are described with reference to a verification program executing various instructions or steps, it will be understood that the verification program or aspects thereof may execute on the intermediate computer and/or the merchant computer, and may be in the form of a mobile application executing on a mobile communication device of the merchant or consumer. Further, the verification program may be in the form of a widget or other SaaS solution that can be utilized by issuers, acquirers and merchants and utilized with mobile payment applications such as GOPAYMENT available from Intuit Inc.

Additionally, certain of the steps may be performed concurrently in a parallel process when possible, as well as performed sequentially. Accordingly, embodiments are intended to exemplify alternatives, modifications, and equivalents that may fall within the scope of the claims.

What is claimed is:

1. A computer-implemented method comprising:
an intermediate computer, in communication through respective networks with a point of sale (POS) device of a merchant and a computer hosting an online social networking website, receiving a request by the POS device for data to be used to verify an identity of the consumer during a first transaction after the POS device has been accessed by the consumer to initiate the first transaction with a payment instrument tendered by the consumer;
the intermediate computer communicating, in response to receiving the request, with the computer hosting the online social networking website and accessing or receiving data of an account the consumer has with the online social networking website;
the intermediate computer determining a challenge question and response options based at least in part upon the account data of the online social networking website, the response options comprising a valid response that is a content item of the account and at least one invalid response, wherein the valid response is selected from the consumer's account and at least one invalid response is selected from another account of another user of the online social networking website; and
the intermediate computer transmitting the challenge question and the response options to the POS device for presentation to the consumer through the POS device, wherein the challenge question and the response options are presented to the consumer through a display of the POS device, and the consumer interacts with the POS device to select a response option to answer the challenge question for verification of the identity of the consumer before the first transaction has been completed based at least in part upon whether the consumer selects the valid response.

2. The method of claim 1, the intermediate computer receiving the request by an in-store POS terminal.

3. The method of claim 1, the intermediate computer receiving the request by the POS device comprising a mobile communication device of the merchant executing a mobile payment application.

4. The method of claim 1, the online social networking website comprising a website that allows registered users to generate profiles from within the website and that reflect relationships or electronic social connections with other users of the website.

5. The method of claim 1, the intermediate computer determining the challenge question and the response options in response to the request received from the POS device, wherein the challenge question and response options are not determined by the intermediate computer before receiving the request.

6. The method of claim 1, the intermediate computer communicating with the computer hosting the online social networking website in response to the request, after the first transaction has been initiated by the consumer accessing and interacting with the POS device.

7. The method of claim 1, further comprising the intermediate computer:
determining or receiving consumer data, and
presenting the consumer data to an interface to the online social networking website to access the consumer's account with the online social networking web site through the interface utilizing the consumer data.

8. The method of claim 7, the request comprising a name appearing on the payment instrument tendered by the consumer, the method further comprising the intermediate computer:
looking up the name in a database;
determining whether consumer data is associated with the name; and
when the intermediate computer determines consumer data associated with the name, accessing the consumer's account utilizing the consumer data, else transmitting a message to the POS device that the intermediate computer was unable to verify the consumer's identity or to request other data from the consumer for use in accessing the consumer's account.

9. The method of claim 8, the consumer data comprising at least one of an electronic mail address and a phone number of the consumer associated with the name, wherein at least one of the electronic mail address and the phone number is included within or is linked to the consumer's account.

10. The method of claim 1, wherein the challenge question and the valid response are not known by the intermediate computer and were not previously selected by the consumer before the intermediate computer receives the request.

11. The method of claim 1, wherein the consumer grants permission to the intermediate computer to access the consumer's account with the online social networking website.

12. The method of claim 1, wherein the intermediate computer has not provided the challenge question or any response option to the consumer before the first transaction has been initiated or before the request.

13. The method of claim 1, wherein the consumer did not select any of the challenge question, the valid response and the invalid response.

14. The method of claim 1, at least the challenge question and the valid response being dynamic such that different challenge questions and respective valid responses based at least in part upon respective data of the consumer's account are determined by the intermediate computer for use during respective different transactions.

15. The method of claim 14, the intermediate computer being in communication through a network with a POS device of a second merchant, wherein after the first transaction has been completed, the consumer tendered the payment instrument to purchase another good or service from a second merchant during a second transaction, the method further comprising the intermediate computer:

the intermediate computer receiving a request by the second POS device of the second merchant for data used to verify an identity of the consume during the second transaction after the POS device of the second merchant has been accessed by the consumer to initiate the second transaction;

the intermediate computer accessing or receiving data of the consumer's account and determining a second challenge question and response options for the second challenge question based at least in part upon the data of the consumer's account, the response options for the second challenge question comprising at least one valid response and at least one invalid response; and the intermediate computer transmitting the second challenge question and the response options for the second challenge question to the second POS device for presentation to the consumer through the second POS device, wherein the second challenge question and the response options for the second challenge question are presented to the consumer through a display of the POS device, and the consumer interacts with the POS device to select a response option to answer the second challenge question for verification of the identity of the consumer before the second transaction has been completed based at least in part upon whether the consumer selects the valid response to the second challenge question.

16. The method of claim 1, the intermediate computer being in communication through respective networks with a POS device of a second merchant and a second computer hosting a second online social networking website different from the first online social networking website, wherein after the first transaction has been completed, the consumer tendered the same or other payment instrument to purchase another good or service from a second merchant during a second transaction, the method further comprising the intermediate computer:

the intermediate computer receiving a request by the second POS device of the second merchant for data used to verify an identity of the consumer during the second transaction after the POS device of the second merchant has been accessed by the consumer to initiate the second transaction;

the intermediate computer accessing or receiving data of an account the consumer has with the second online social networking website and determining a second challenge question and response options for the second challenge question based at least in part upon the data of the consumer's account with the second online social networking web site, the response options for the second challenge question comprising at least one valid response and at least one invalid response; and the intermediate computer transmitting the second challenge question and the response options for the second challenge question to the second POS device for presentation to the consumer through the second POS device, wherein the second challenge question and the response options for the second challenge question are presented to the consumer through a display of the POS device, and the consumer interacts with the POS device to select a response option to answer the second challenge question for verification of the consumer before the second transaction has been completed based at least in part upon whether the consumer selects the valid response to the second challenge question.

17. The method of claim 16, wherein the second challenge question is different from the first challenge question, and the response options for the first challenge question are different from the response options for the second challenge question.

18. The method of claim 1, the intermediate computer being in communication with multiple computers hosting respective different online social networking websites at which the consumer has respective accounts, further comprising the intermediate computer determining which online social networking website of respective online social networking websites should be utilized for determining the challenge question and response options.

19. The method of claim 18, wherein an online social network website that includes the most recent online activity by the consumer is utilized to determine at least the challenge question and the valid response.

20. The method of claim 18, wherein an online social networking website having the most consumers as account holders that are also registered with the intermediate computer is selected to determine at least the challenge question and the valid response.

21. The method of claim 18, wherein a first account the consumer has with a first online social networking website is used to determine a first challenge question and response options for the first challenge question for a first pre-determined number of transactions, and a second account the consumer has with a second online social networking web site is used to determine a second challenge question and response options for the second challenge question for a second pre-determined number of transactions.

22. The method of claim 18, wherein a first account the consumer has with a first online social networking website is used to determine a first challenge question and response options for the first challenge question for transactions initiated during a first period of time, and a second account the consumer has with a second online social networking website is used to determine a second challenge question and response options for the second options for transactions initiated during a second period of time.

23. The method of claim 18, the intermediate computer alternating between different accounts the consumer has with different online social networking websites to determine respective challenge questions and respective response options.

24. The method of claim 18, wherein at least one response option for the challenge question is determined from a first account the consumer has with a first online social networking website, and at least one other response option for the challenge question is determined from a second account the consumer has with a second online social networking website.

25. The method of claim 18, further comprising the intermediate computer aggregating data of multiple accounts the consumer has at respective online social networking websites and determining at least the challenge question and at least one valid response based at least in part upon aggregated data.

26. The method of claim 1, wherein verification of the consumer's identity is based at least in part upon the consumer answering a single challenge question with the valid response to that single challenge question.

27. The method of claim 26, the intermediate computer determining multiple challenge questions and respective response options and transmitting the multiple challenge questions and respective response options to the POS device, wherein verification of the consumer's identity is based at least in part upon the consumer answering multiple challenge questions with respective valid responses.

28. The method of claim 1, the at least one invalid response being selected from an account of another user of the social networking website that is not an online social connection of the consumer.

29. The method of claim 1, the at least one invalid response being selected from an account of another user of the social networking website that is not an online social connection of the consumer but that is an online social connection of one of the consumer's online social connections.

30. The method of claim 1, the at least one invalid response being selected from an account of another user of the online social networking website that is not an online social connection of the consumer and the other user is separated from the consumer within the online social networking website by at least a pre-determined minimum degree of separation.

31. The method of claim 30, the consumer and the other user being separated from each other by at least three degrees of separation.

32. The method of claim 1, the intermediate computer determining or selecting at least one invalid response utilizing data outside of the online social networking website.

33. The method of claim 32, further comprising the intermediate computer:
executing an internet search independently of the social networking website; and
selecting a content item identified by the internet search as an invalid response.

34. The method of claim 1, the intermediate computer determining or selecting a content item of the consumer's account as the valid response option based at least in part upon when online activity within the consumer's account occurred or when that content item was created or posted to the account.

35. The method of claim 1, the intermediate computer:
selecting the content item of the consumer's account as the valid response;
determining data associated with the selected content item, and
deriving the challenge question based at least in part upon the associated data.

36. The method of claim 1, the response options comprising photographs, wherein at least one photograph is selected by the intermediate computer from the consumer's account as the valid response option, and at least one photograph is selected by the intermediate computer from a source other than the consumer's account as an invalid response.

37. The method of claim 36, the photograph selected as the valid response option comprising a photograph taken by the consumer and posted to the consumer's account.

38. The method of claim 36, the photograph selected as the valid response option comprising a photograph in which the consumer is tagged, wherein the consumer or an online connection of the consumer tagged the consumer in the selected photograph.

39. The method of claim 1, the response options comprising data of or identifying audio or video files, wherein at least one audio or video file is selected by the intermediate computer from the consumer's account as the valid response option, and at least one audio or video file is selected by the intermediate computer from a source other than the consumer's account as an invalid response.

40. The method of claim 39, an audio or video file being selected as the valid response based at least in part upon at least one of how recently the audio or video file was purchased or viewed and a frequency with which the audio or video file is played.

41. The method of claim 1, response options comprising electronic check-in data, wherein a location at which the consumer electronically checked in using a mobile communication device is selected as the valid response.

42. The method of claim 1, response options comprising a first type of content item and a second type of content item different from the first type of content item.

43. The method of claim 1, response options comprising names, at least one name being online social network connection of the consumer and selected as the valid response, and at least one other name is not an online social network connection of the consumer.

44. The method of claim 1, wherein the payment instrument is a payment card tendered by the consumer.

45. The method of claim 44, wherein the intermediate computer is also in communication with a computer of an issuer of the payment card, the method further comprising the intermediate computer:
communicating with the computer of an issuer of the payment card in response to the request;
receiving authorization data generated by the issuer computer; and
transmitting the authorization data to the point of sale device.

46. The method of claim 45, the authorization data, the challenge question and the response options being transmitted together by the intermediate computer to the point of sale device.

47. The method of claim 45, the authorization data indicating that the payment card has been authorized for the transaction, wherein the transaction is not completed based at least in part upon the consumer failing to select the valid response in response to the challenge question.

48. The method of claim 1, the intermediate computer determining the challenge question and response options in response to the request and while the consumer is waiting at the point of sale device.

49. The method of claim 1, wherein the intermediate computer accesses the account that the consumer has with the online social networking websites through an application programming interface (API) to the online social networking website.

50. The method of claim 1, wherein the intermediate computer accesses a table in the account that the consumer has with the online social networking website, the table comprising:

a plurality of rows, and
a plurality of columns,
wherein respective rows identify respective consumers, and
wherein at least one column includes account data and is updated to reflect respective online activities of respective consumers.

51. The method of claim 50, wherein the at least one column is updated to reflect recent online activities of a consumer involving at least one of a photo, a comment, a tag, a video, a pin, a message, a chronological summary, and a message of the account.

52. The method of claim 1, after accessing or receiving data of an account the consumer has with the online social networking website, further comprising the intermediate computer filtering the account data based at least in part upon pre-determined criteria, wherein a result of filtering is utilized by the intermediate computer to select at least one challenge question and a valid response option.

53. The method of claim 52, wherein the pre-determined criteria is at least one of a date that content was posted to the consumer's account with the online social networking website, a degree of connectedness of the consumer within the online social networking website, and connections the consumer has through the online social networking website.

54. The method of claim 1, wherein the transaction is initiated by the consumer swiping the payment instrument through the POS device.

55. A system for providing a merchant with data for verifying an identity of a consumer that has tendered a payment instrument to purchase a good or service from a merchant during a first transaction, the system comprising an intermediate computer in communication through respective networks with a point of sale (POS) device of the merchant and a computer hosting an online social networking website and configured to:
receive a request by the POS device for data to be used to verify an identity of the consumer during the first transaction after the POS device has been accessed by the consumer to initiate the first transaction with the payment instrument tendered by the consumer;
access or receive, in response to receiving the request, by the intermediate computer and from the computer hosting the online social networking website, data of an account the consumer has with the online social networking website;
determine a challenge question and response options based at least in part upon the account data of the online social networking website, the response options comprising a valid response that is a content item of the account and at least one invalid response, wherein the valid response is selected from the consumer's account and at least one invalid response is selected from another account of another user of the online social networking website; and
transmit the challenge question and the response options to the POS device for presentation to the consumer through the POS device, wherein the challenge question and the response options are presented to the consumer through a display of the POS device, and the consumer interacts with the POS device to select a response option to answer the challenge question for verification of the consumer before the first transaction has been completed based at least in part upon whether the consumer selects the valid response.

56. The system of claim 55, further comprising the POS device.

57. The system of claim 55, further comprising the computer hosting the online social networking website.

58. The system of claim 55, further comprising the POS device and the computer hosting the online social networking website.

59. A computer program product comprising a non-transitory computer readable storage medium embodying one or more instructions executable by an intermediate computer, in communication through respective networks with a point of sale (POS) device of a merchant and a computer hosting an online social networking website, to perform a process for providing a merchant with data for verifying an identity of a consumer that has tendered a payment instrument to purchase a good or service from a merchant during a first transaction, the process comprising:
receiving a request by the POS device for data to be used to verify an identity of the consumer during the first transaction after the POS device has been accessed to initiate the first transaction with the payment instrument tendered by the consumer;
communicating, in response to receiving the request, with the computer hosting the online social networking website and accessing or receiving data of an account the consumer has with the online social networking website;
determining a challenge question and response options based at least in part upon the account data of the online social networking website, the response options comprising a valid response that is a content item of the account and at least one invalid response, wherein the valid response is selected from the consumer's account and at least one invalid response is selected from another account of another user of the online social networking website; and
transmitting the challenge question and the response options to the POS device for presentation to the consumer through the POS device, wherein the challenge question and the response options are presented to the consumer through a display of the POS device, and the consumer interacts with the POS device to select a response option to answer the challenge question for verification of the consumer before the first transaction has been completed based at least in part upon whether the consumer selects the valid response.

60. A computer-implemented method comprising:
an intermediate computer in communication through respective networks with a point of sale (POS) device of a merchant and a computer hosting an online social networking website receiving a request by the POS device for data to be used to verify an identity of the consumer during the first transaction after the POS device has been accessed by the consumer to initiate the first transaction with a payment instrument tendered by the consumer;
the intermediate computer communicating, in response to receiving the request, with the computer hosting the online social networking website and accessing or receiving data of an account the consumer has with the online social networking website;
the intermediate computer determining a challenge question and response options based at least in part upon the account data of the online social networking website, the response options comprising a valid response that is a content item of the account and at least one invalid response, wherein the valid response is selected from the consumer's account and at least one invalid response is selected from another account of another user of the online social networking website;

the intermediate computer transmitting the challenge question and the response options to the POS device for presentation to the consumer through the POS device, wherein the challenge question and the response options are presented to the user through a display of the POS device, and the consumer interacts with the POS device to select a response option;

the intermediate computer receiving a response option that was selected by the consumer from the POS device; the intermediate computer determining whether the selected response option is the valid response to generate a result; and the intermediate computer transmitting, through a network, a result to the POS device for verification of the identity of the consumer before the first transaction has been completed based at least in part upon whether the consumer selects the valid response.

61. A computer-implemented method comprising:

an intermediate computer, in communication through respective networks with a point of sale (POS) device of a merchant and multiple computers hosting respective different online social networking websites at which the consumer has respective accounts, receiving a request by the POS device for data to be used to verify an identity of the consumer during a first transaction after the POS device has been accessed by the consumer to initiate the first transaction with a payment instrument tendered by the consumer;

the intermediate computer communicating, in response to receiving the request, with respective computers hosting respective online social networking web sites and accessing or receiving data of respective accounts the consumer has with respective online social networking web sites;

the intermediate computer selecting an online social networking website of respective online social networking websites to be utilized for determining the challenge question and response options, wherein an online social networking website having the most consumers as account holders that are also registered with the intermediate computer is selected by the intermediate computer to determine at least the challenge question and a valid response;

the intermediate computer determining a challenge question and response options based at least in part upon the account data of the selected online social networking website, the response options comprising the valid response that is a content item of the account of the consumer and at least one invalid response; and the intermediate computer transmitting the challenge question and the response options to the POS device for presentation to the consumer through the POS device, wherein the challenge question and the response options are presented to the consumer through a display of the POS device, and the consumer interacts with the POS device to select to allow the consumer to select a response option to answer the challenge question for verification of and allow the merchant to verify the identity of the consumer before the first transaction has been completed based at least in part upon whether the consumer selects the valid response.

62. A computer-implemented method comprising:

an intermediate computer, in communication through respective networks with a point of sale (POS) device of a merchant and multiple computers hosting respective different online social networking websites at which the consumer has respective accounts, receiving a request by the POS device for data to be used to verify an identity of the consumer during a first transaction after the POS device has been accessed by the consumer to initiate the first transaction with a payment instrument tendered by the consumer;

the intermediate computer communicating, in response to receiving the request, with respective computers hosting respective online social networking websites and accessing or receiving data of respective accounts the consumer has with respective online social networking websites;

the intermediate computer selecting an online social networking website of respective online social networking websites to be utilized for determining the challenge question and response options;

the intermediate computer determining a challenge question and response options based at least in part upon the account data of the selected the online social networking website, the response options comprising a valid response that is a content item of the account and at least one invalid response, wherein a first account the consumer has with a first online social networking website is used to determine a first challenge question and response options for the first challenge question for a first pre-determined number of transactions, and a second account the consumer has with a second online social networking website is used to determine a second challenge question and response options for the second challenge question for a second pre-determined number of transactions; and the intermediate computer transmitting the challenge question and the response options to the POS device for presentation to the consumer through the POS device, wherein the challenge question and the response options are presented to the consumer through a display of the POS device, and the consumer interacts with the POS device to select to allow the consumer to select a response option to answer the challenge question for verification of and allow the merchant to verify the identity of the consumer before the first transaction has been completed based at least in part upon whether the consumer selects the valid response.

63. A computer-implemented method comprising:

an intermediate computer, in communication through respective networks with a point of sale (POS) device of a merchant and multiple computers hosting respective different online social networking websites at which the consumer has respective accounts, receiving a request by the POS device for data to be used to verify an identity of the consumer during a first transaction after the POS device has been accessed by the consumer to initiate the first transaction with a payment instrument tendered by the consumer;

the intermediate computer communicating, in response to receiving the request, with respective computers hosting respective online social networking websites and accessing or receiving data of respective accounts the consumer has with respective online social networking websites;

the intermediate computer selecting an online social networking website of respective online social networking websites to be utilized for determining the challenge question and response options;

the intermediate computer determining a challenge question and response options based at least in part upon the account data of the selected the online social networking website, the response options comprising a valid response that is a content item of the account and at least one invalid response, wherein a first account the consumer has with a first online social networking website is used to determine a first challenge question and response options for the first challenge question for transactions initiated during a first period of time, and a second account the consumer has with a second online social networking web site is used to determine a second challenge question and response options for the second options for transactions initiated during a second period of time; and the intermediate computer transmitting the challenge question and the response options to the POS device for presentation to the consumer through the POS device, wherein the challenge question and the response options are presented to the consumer through a display of the POS device, and the consumer interacts with the POS device to select to allow the consumer to select a response option to answer the challenge question for verification of and allow the merchant to verify the identity of the consumer before the first transaction has been completed based at least in part upon whether the consumer selects the valid response.

64. A computer-implemented method comprising:

an intermediate computer, in communication through respective networks with a point of sale (POS) device of a merchant and multiple computers hosting respective different online social networking websites at which the consumer has respective accounts, receiving a request by the POS device for data to be used to verify an identity of the consumer during a first transaction after the POS device has been accessed by the consumer to initiate the first transaction with a payment instrument tendered by the consumer;

the intermediate computer communicating, in response to receiving the request, with respective computers hosting respective online social networking websites and accessing or receiving data of respective accounts the consumer has with respective online social networking websites;

the intermediate computer selecting an online social networking website of respective online social networking websites to be utilized for determining the challenge question and response options;

the intermediate computer determining a challenge question and response options based at least in part upon the account data of the selected the online social networking website, the response options comprising a valid response that is a content item of the account and at least one invalid response, wherein at least one response option for the challenge question is determined from a first account the consumer has with a first online social networking website, and at least one other response option for the challenge question is determined from a second account the consumer has with a second online social networking website; and the intermediate computer transmitting the challenge question and the response options to the POS device for presentation to the consumer through the POS device, wherein the challenge question and the response options are presented to the consumer through a display of the POS device, and the consumer interacts with the POS device to select to allow the consumer to select a response option to answer the challenge question for verification of and allow the merchant to verify the identity of the consumer before the first transaction has been completed based at least in part upon whether the consumer selects the valid response.

\* \* \* \* \*